(12) United States Patent
Herbert

(10) Patent No.: US 9,030,843 B1
(45) Date of Patent: May 12, 2015

(54) HIGH FREQUENCY SQUARE-WAVE POWER DISTRIBUTION SYSTEM

(76) Inventor: Edward Herbert, Canton, CT (US)

( * ) Notice: Subject to any disclaimer, the term of this patent is extended or adjusted under 35 U.S.C. 154(b) by 318 days.

(21) Appl. No.: 13/476,952

(22) Filed: May 21, 2012

Related U.S. Application Data

(63) Continuation-in-part of application No. 12/704,862, filed on Feb. 12, 2010, now abandoned.

(60) Provisional application No. 61/488,721, filed on May 21, 2011.

(51) Int. Cl.
H02M 3/335 (2006.01)

(52) U.S. Cl.
CPC .................................. H02M 3/33507 (2013.01)

(58) Field of Classification Search
USPC ......... 363/17, 15, 21.02, 21.05, 21.06, 21.13, 363/2, 1.14, 84, 89, 127; 307/106–108
See application file for complete search history.

(56) References Cited

U.S. PATENT DOCUMENTS

| | | | |
|---|---|---|---|
| 5,684,678 A * | 11/1997 | Barrett | 363/17 |
| 6,456,510 B1 * | 9/2002 | Patel et al. | 363/21.06 |
| 2005/0207195 A1 * | 9/2005 | Olsson et al. | 363/125 |
| 2006/0152947 A1 * | 7/2006 | Baker et al. | 363/16 |
| 2007/0195566 A1 * | 8/2007 | Nielsen et al. | 363/53 |
| 2011/0084654 A1 * | 4/2011 | Julstrom et al. | 320/108 |

* cited by examiner

Primary Examiner — Jessica Han
Assistant Examiner — Gustavo Rosario Benitez

(57) ABSTRACT

A minimalized power converter has a square-wave voltage source operating at 100 percent duty-ratio, a series inductance and a rectifier. A high frequency square-wave power distribution system comprises a plurality of minimalized power converters connected by a common ac power distribution link. Because the ac power distribution link carries current at a high frequency, the square-wave may be degraded by the stray inductance with distance. Re-squaring circuits along the length of the ac power distribution link operating synchronously restore and preserve the integrity of the square-wave. The minimalized power converter is very flexible and has very fast dynamic response, being able to make very fast controlled current transitions from any current to any other current, including zero or current reversal (same voltage, opposite current flow).

13 Claims, 16 Drawing Sheets

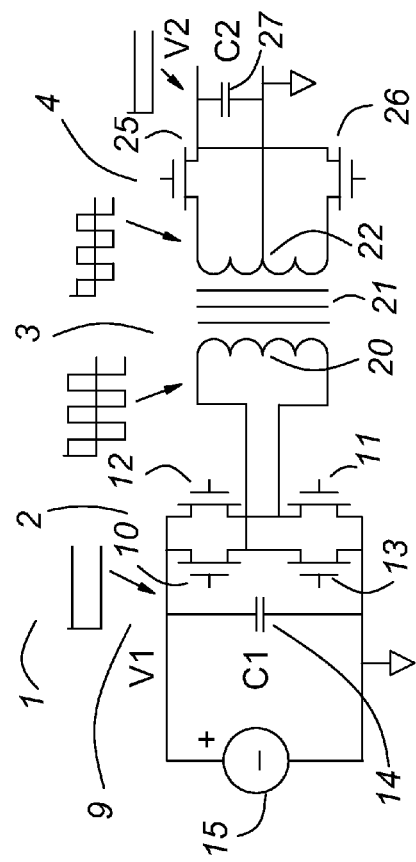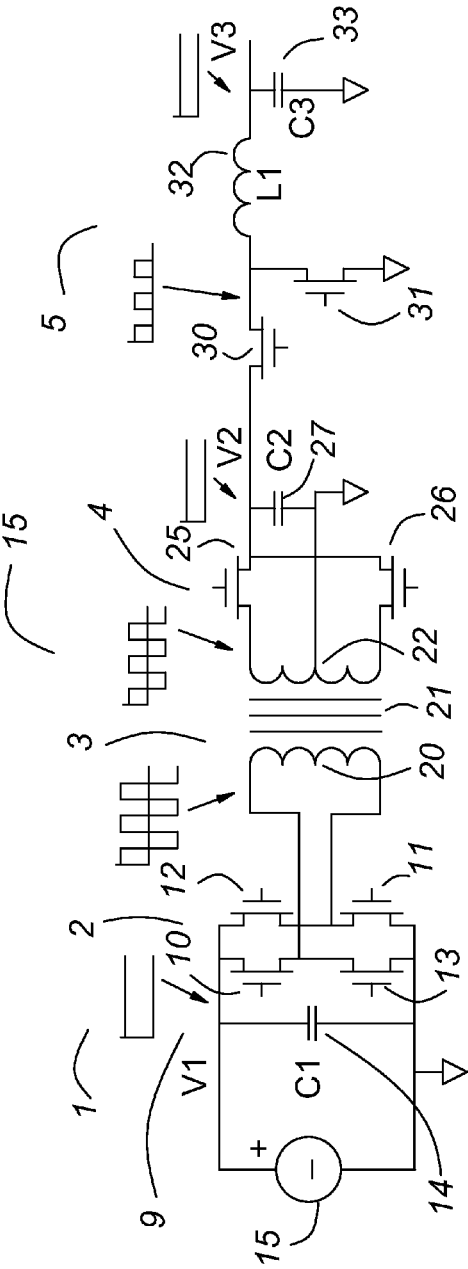
Fig. 1 Prior art
Fig. 2 Prior art

HIGH FREQUENCY SQUARE-WAVE POWER DISTRIBUTION SYSTEM

This patent application is a continuation in part of Ser. No. 12/704,862, (now abandoned) filed Feb. 12, 2010, and entitled "Multi-port Variable Transformer." This patent application is incorporated herein by reference.

This patent application is a continuation in part of Ser. No. 61/488,721, filed May 21, 2011, and entitled "Minimalized Power Converter." This patent application is incorporated herein by reference, and priority is claimed to its filing date.

Reference is made to U.S. provisional patent application Ser. No. 61/349,289, filed May 28, 2010 and entitled "Interleaved Current Doubler with Common Mode Capacitor".

Reference is made to U.S. patent application Ser. No. 13/118,676, filed May 31, 2011 and entitled "Interleaved Current Doubler with Common Mode Capacitor", now U.S. Pat. No. 8,310,329, issued Nov. 13, 2012 and now entitled: Interleaved Common Mode Transformer with Common Mode Capacitors.

Reference is made to a U.S. Pat. No. 7,119,648, issued Oct. 10, 2006 and entitled "Coaxial Push-Pull Transformers for Power Converters and Like Circuits".

Reference is made to a U.S. Pat. No. 7,023,317, issued Apr. 4, 2006 (now expired) and entitled "Cellular Transformers".

Reference is made to a U.S. Pat. No. 6,992,520, issued Jan. 31, 2006 and entitled "Gate Drive Method and Apparatus for Reducing Losses in the Switching of MOSFETs".

Reference is made to a U.S. Pat. No. 7,394,230, issued Jul. 1, 2008 and entitled "Total Charge Measurement".

BACKGROUND OF THE INVENTION

This invention relates to power converters, and in particular, power converter systems with a plurality of regulated output voltages. The power converter system may also accept power from multiple voltage sources. A power system for a server rack in a data-center is an example.

The high frequency square-wave power distribution system has its genesis in a prior art dc-dc converter as shown in FIG. 1. Usually, the output voltage is defined by the input voltage and the transformer turns-ratio and is not adjustable. To provide a regulated output, a post-regulation circuit may be added as shown in FIG. 2. Alternatively, a pre-regulator may be added.

A power supply topology known as a "dual active bridge" sometimes is used to regulate voltage through a transformer with sufficient leakage inductance or with added inductance.

SUMMARY OF THE INVENTION

If a full-bridge switch has a precise input voltage, a tightly coupled input capacitor and uses MOSFET switches with a very low voltage drop, the resulting square-wave also has a precise voltage magnitude. If the switching is 100 percent duty-ratio (50-50 for each switching cycle) and the switch drive is crisp, the square-wave will be clean and have crisp transitions with minimal rounding. When such a square-wave is rectified, the resulting dc will be clean and require very minimal filtering. Fast switching not only ensures a clean wave-form, it also reduces crossover power loss for improved efficiency. U.S. Pat. No. 6,992,520 teaches a method for the very fast switching of MOSFETs, which are commonly used in full-bridge switches and rectifiers.

However, if there is significant leakage inductance in the circuit between the full-bridge switch and the rectifier, the square-wave at the rectifier may be compromised, with rounded transitions showing characteristic exponential rise and fall times, and the voltage may droop as the load is increased. If, however, the rectifier has a tightly coupled output capacitor with sufficient capacitance to hold the voltage essentially constant over the time of interest, and if its switches have a crisp drive, the square-wave will be re-squared, with current flowing back through the rectifier switches to supplement the rounded forward current. This has to be the case as the voltage drop through the rectifier switches is small, and the rectifier switches are momentarily full-bridge switches with respect to the voltage on the capacitor.

In a prior art power converter, it is usual to use a dc-dc transformer to generate a fixed voltage output, often 12 V dc, a common voltage in server racks in data-centers. The dc-dc transformer may have a pre-regulator, or it may pulse-width-modulate (pwm) the excitation of the transformer to regulate the output voltage. In the later case, quite large filters are needed both on the input and the output to smooth the ripple and attenuate the noise. It is then common to use the 12 V dc output to power a number of point of load (pol) regulators to make a number of different output voltages at a number of different locations in the system. Looking at the power flow, first there is a large input filter, then a pwm full-bridge switch, a transformer, a rectifier, a large output filter, a buck converter and another large output filter.

It was contemplated that if a precise input voltage were switched full-bridge, the full-bridge switched square-wave voltage could be an ac power distribution link to a number of transformers, each with a rectifier output. In many cases, this would provide output voltages of sufficient precision. With a crisp square-wave, minimal output filtering would be needed and there are fewer conversion stages, for greater efficiency. If a buck post regulator is not needed, an inductor is saved and much less output filtering is needed, which together offsets some of the cost of the transformer.

However, if the ac link has any significant length, in the order of ten or twenty centimeters or even a meter or two, as an example, not a limitation, the stray inductance may be sufficient to degrade the square-wave badly at high switching frequencies. Due to space limitations, it is considered necessary to use a high switching frequency in the order of 250 kHz to 4 MHz or even higher so that the magnetics and capacitors are small. Granted, a rectifier with a tightly coupled output capacitor improves the square-wave, but modeling in SPICE shows that there still there is significant droop as the load increases.

In the spirit of the familiar saying, "when someone gives you lemons, make lemonade," the series inductance in the ac link can be used to make a fairly precise current controller. When reduced to its basic elements, a voltage controller often is a current controller feeding a capacitor, with the current modulated to maintain the correct charge on the capacitor so that the voltage is constant. Thus the series inductance became an element of a voltage regulator.

The series inductance can be only the stray inductance and the leakage inductance of the circuit and the transformer, but this is poorly controlled, and it may be preferred to use an inductor, a discrete component, for improved control of the parameters. Even if an inductor is used, for analysis the inductance is a lumped inductance of all series inductances. These must be reflected to a common point relative to the transformer, and usually the ac link is the appropriate common point.

At low frequencies, in the order of 50 kHz to 100 kHz, a good transformer will have insufficient stray and leakage inductance, and a discrete inductor almost certainly will be required. At high frequencies, greater than 1 MHz, the stray and leakage inductance may be too high for optimum current control as taught by this invention. However, transformers made in accordance with U.S. 61/349,289; U.S. Pat. No. 7,394,135; U.S. Pat. No. 7,119,648; U.S. 61/638,976 and/or 61/649,315 have particularly low stray and leakage inductance and are enabling technology for this invention.

A power supply topology known as a "dual active bridge" sometimes is used to regulate voltage through a transformer with sufficient leakage inductance or with added inductance.

For some applications, a dc voltage is switched full-bridge to make a square-wave ac voltage. In others there will be an available source of square-wave ac voltage. If there is then a series inductance and a rectifier, the basic elements are there for a minimalized power converter, as shown in FIG. 4. Usually there will also be a transformer, to provide a step-down or step-up turns-ratio and isolation. If there is a transformer with a non-unity turns-ratio, the voltages, currents and impedances are reflected through the transformer to a common point for analysis. Preferably, the input voltage Vi and the output voltage Vo reflected through the transformer will be nominally the same, and that condition is discussed first. When the source square-wave voltage and the rectifier are synchronized, that is, they transition through zero at the same instant, the voltage across the inductor is nominally zero, and the current cannot change.

If the timing of the rectifier varies from that of the source square-wave, as defined in FIG. 5, during the "offset time t", or "transition time t", two times the voltage appears across the inductor and the current changes very rapidly. An algorithm is given that very closely approximates the transition time t, useful for SPICE modeling and for feedforward control. It is very unlikely that the circuit parameters can be known with sufficient accuracy to use feedforward alone, but if it is most of the control, stability and the response time will be improved. Feedback can then be used to tweak the control for a precise output.

If the load current changes, the current through the inductor can be changed conveniently at each transition of the ac square-wave by varying the transition time t, and approximation formulae are given for many examples. Asynchronous transitions can be used for even faster control of the current.

The teachings of this invention are less useful with push-pull switches and rectifiers unless the coupling is very good. Alternative circuits are shown, and symmetrical push-pull switches and rectifiers with common mode capacitors are a preferred alternative. Unlike a conventional push-pull winding, both conductors of a symmetrical push-pull winding with common mode capacitors conduct all of the time.

A modified algorithm is shown for the case where the input and output voltages (reflected through the transformer to a common point) are not nominally equal. Depending upon the details of the design and the trade-offs, a variation of plus or minus ten percent is easily accommodated, sufficient to correct for line regulation in many applications and more than sufficient to correct for load regulation.

In a larger power distribution system, for example, not a limitation, for power distribution within a server rack in a data-center, the high frequency square-wave power distribution system can be expanded to provide a plurality of output voltages and to accept redundant input voltages. It may also be coupled to a battery or other energy storage source or alternate power source and provide two way current control, perhaps charging and discharging a battery or capacitor bank, as examples, not limitations. Given a full-bridge switch or a rectifier with a tightly coupled capacitor of sufficient size, an ac square-wave voltage can provide an ac power distribution link to many point of load (pol) power converters.

In some instances, the teachings of this invention can be used for several transformers and several rectifiers operated synchronously with a common source inductor, as shown in FIG. 29. This invention teaches that the capacitors (reflected through the transformer) effectively add to be a collective capacitor. The parallel stray and leakage inductances of the transformer are in parallel, so the net inductance is lower. If feedback is taken from one output, the others will track closely, albeit with some cross regulation. For better control, the teachings of U.S. Pat. No. 7,394,230 can be used.

A simple dc-dc isolated minimalized power converter comprises a full-bridge switch, a transformer and a rectifier with series inductance. Several examples are shown. The simple isolated minimalized power converter may also accept a square-wave voltage of arbitrary frequency as its input. This invention teaches how to change the frequency of the square-wave voltage to optimize the minimalized power converter.

A power supply topology known as a "dual active bridge" sometimes is used to regulate voltage through a transformer with sufficient leakage inductance or with added inductance. To the best of my knowledge and belief, the teachings of the dual active bridge have not been applied to a power distribution system with elements located apart from each other or having an ac link or having multiple inputs and/or outputs.

If the ac link is long, it may have significant stray inductance, increasing as the length is increased. This invention teaches that full-bridge re-squaring circuits can be used to re-square the square-wave ac voltage and synchronize it throughout the system as shown in FIG. 34. The re-squaring circuit is essentially a full-bridge rectifier with a capacitor on its output. It may also be used for the transfer of power, but that is optional. Examples of both are shown in FIG. 35.

BRIEF DESCRIPTION OF THE FIGURES

FIG. 1 shows a prior art dc-dc transformer with a square-wave voltage input.

FIG. 2 shows a prior art dc-dc transformer with a square-wave voltage input having a buck converter to regulate the output voltage.

In FIG. 27, Vi=Vo, and in FIG. 28, Vi≠Vo.

DETAILED DESCRIPTION

Figure 3:
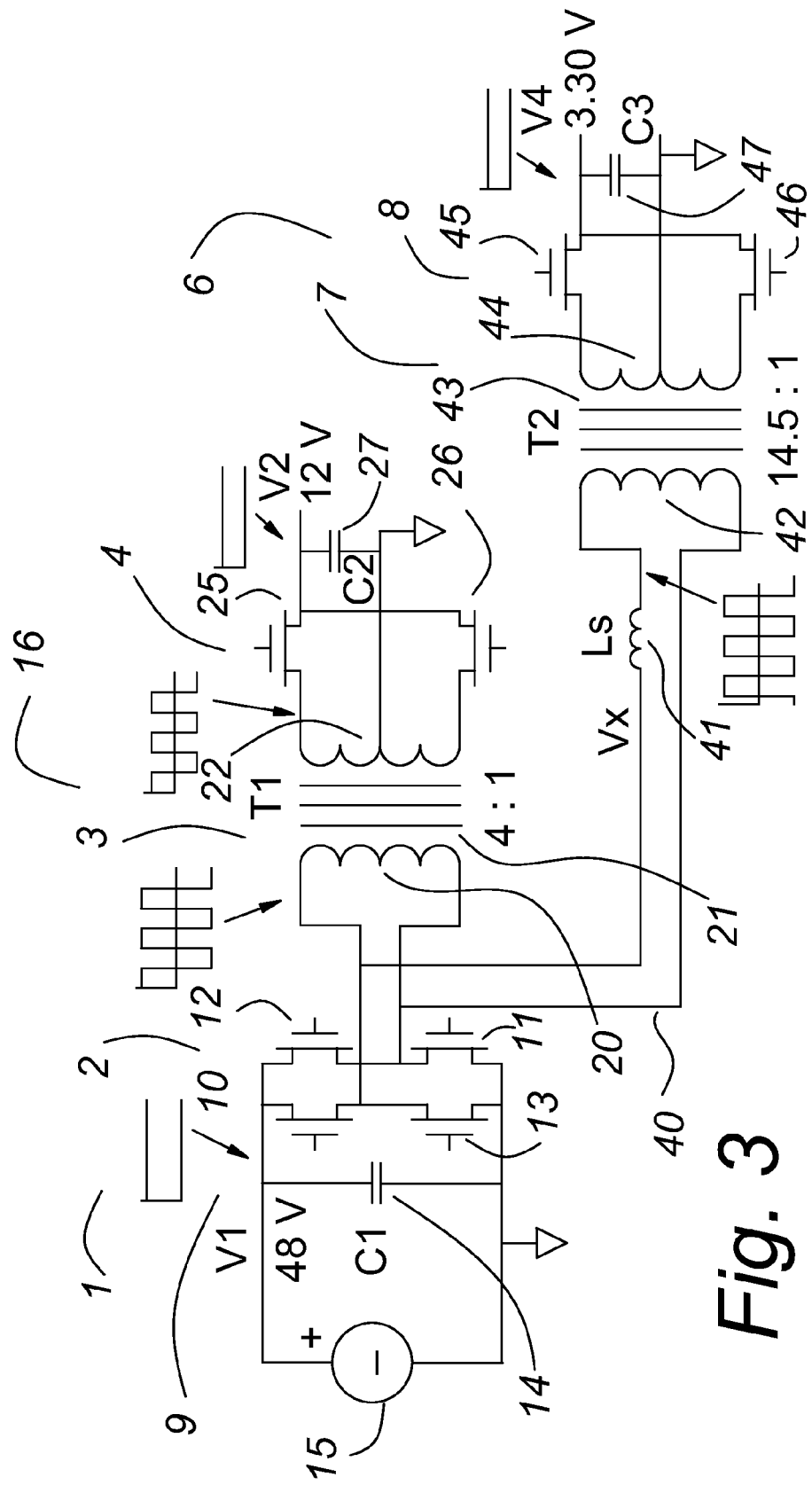
FIG. 3 shows a high frequency square-wave power distribution system with a square-wave voltage input and having two output voltages.

FIG. 1 shows an example of a common power converter circuit often called a "dc-dc transformer." Of course, all transformers use ac excitation, but a high frequency transformer together with full-bridge switches on its input and rectifying switches on its output as a whole circuit accepts a dc input voltage and provides a dc output voltage, thus its common name.

In FIG. 1, a dc-dc transformer 1 comprises a full-bridge switch 2, a transformer 3 and a rectifier 4. An input capacitor 14 and an output capacitor 27 are usually included as filter capacitors. A square-wave voltage source 9 comprises a dc voltage source 15 and the full-bridge switch 2, comprises four switches 10-13 shown as MOSFETs, as an example, not a limitation. The transformer 3 comprises a primary winding 20, a transformer core 21 and a secondary winding 22. The rectifier 4 is shown as a push-pull rectifier, as an example, not a limitation, and comprises two switches 25 and 26, shown as MOSFETs, as an example, not a limitation. When MOSFETs are used, the rectifier 4 is a synchronous rectifier. As is well known to one skilled in the art of power converter circuits, the full-bridge switch and rectifier switches shown require gate drivers and control logic to ensure switching with the correct timing. These are not a point of novelty and are not shown in FIG. 1 or the other figures to simplify the drawings. Their design, use and application would be well known by one skilled in the art of power converters.

In FIG. 1, small graphs point to various parts of the circuit and represent the voltage waveforms of the respective nodes. 100 percent duty-ratio switching is shown, resulting in the very clean square-wave voltages on the primary winding 20 and the secondary winding 22. The voltage drop through the full-bridge switch 2 is very low if good MOSFET switches are used, so the square-wave voltage on the primary winding has quite precise voltage amplitude, differing from the voltage on the input capacitor 14 only by the voltage drop of the switches 10-13.

With a good transformer having low parasitic inductance, the square-wave voltage on the secondary winding 22 is also quite precise, but may have some distortion due to the parasitic inductance of the transformer 3. However, the filter capacitor 27 has a reasonably constant voltage under normal operating conditions, and the voltage drop through the rectifier 4 is very low if good MOSFETs are used. The synchronous rectifier switches 25 and 26 also switch with 100 percent duty-ratio, so the square-wave voltage on the secondary winding 22 is also very clean. Any distortion caused by the parasitic inductance of the transformer 3 is removed by conduction back through the rectifier switches 25 and 26 from the capacitor 27.

FIG. 2 shows a power converter 15, illustrating that it is common to add a second power converter 5 to the output of a dc-dc transformer 1 to further condition the voltage, to make an output voltage V3 in this example. The second power converter 5 is shown as a familiar buck converter, as an example, not a limitation, comprising buck switches 30 and 31, shown as MOSFETs, as an example, not a limitation. The buck switches 30 and 31 switch alternately to provide a chopped waveform as shown to the input of a buck inductor 32. An output capacitor 33 smoothes the current ripple through the buck inductor 32, as would be known by one skilled in the art of power converters. All of the current to the load (not shown) passes through the rectifier 4 and the second power converter 5, with losses in each.

FIG. 3 shows a power converter 16, illustrating an alternative way to provide a second output voltage V4. A high frequency square-wave ac power distribution link feeds a second transformer circuit 6 comprising a second transformer 7 and a second rectifier 8. The second transformer 7 comprises a primary winding 44, a transformer core 43 and a secondary winding 44. The second rectifier 8 comprises switches 45 and 46, shown as MOSFETs as an example, not a limitation. An output capacitor 47 may filter the output voltage V4. An inductor 41 may be a discrete component as shown, it may represent the parasitic inductance of the transformer and its interconnections, or it may represent both as a lumped parameter. For analysis, it is a lumped inductance and includes the stray and parasitic inductances of the transformer 7.

The idea is that the power converter 16 of FIG. 3 may be more efficient than the power converter 15 of FIG. 2. In the power converter 16 of FIG. 3, all of the load current passes through the full-bridge switch 2, but only part of the load current passes through the transformer 3 and the rectifier 4. The rest passes through the second transformer 7 and the second rectifier 8. In as much of the losses vary as the square of the current, dividing the current into two comparable paths reduces the loss. As an example, if half the current passes through the transformer 3 and the rectifier 4, its losses due to conduction are one fourth. If the other half of the current passes through the second transformer 7 and the second rectifier 8, it also has one fourth the losses due to conduction. The net losses due to conduction are reduced by half. This simple example assumes equal currents in the two paths and equal resistive losses, which may not represent a practical application, but the teaching that dividing the current path and eliminating series power stages reduces the losses as a generality is valid.

Neither current path in FIG. 3 bears the losses of the second power converter 5 of FIG. 2, and the clean square-wave of the second transformer circuit 6 requires much less filtering when rectified than does the output of the buck converter. The added excitation losses of the second transformer 7 partly offset the advantage, so a system trade-off is necessary to determine the net advantage.

Additional transformer circuits can be added to the dc-dc converter 1 of FIG. 1 as in FIG. 3, and examples will be discussed for FIGS. 29, 30 and 35. Alternatively, other transformer circuits can be connected to the secondary winding 22 or to any tap of either the primary winding 20 or the secondary winding 22. In this manner, the ac excitation of the transformer 3 may become an ac link to other transformer circuits and a variety of square-wave voltages are available without further conversion or additional series components.

Figure 4:
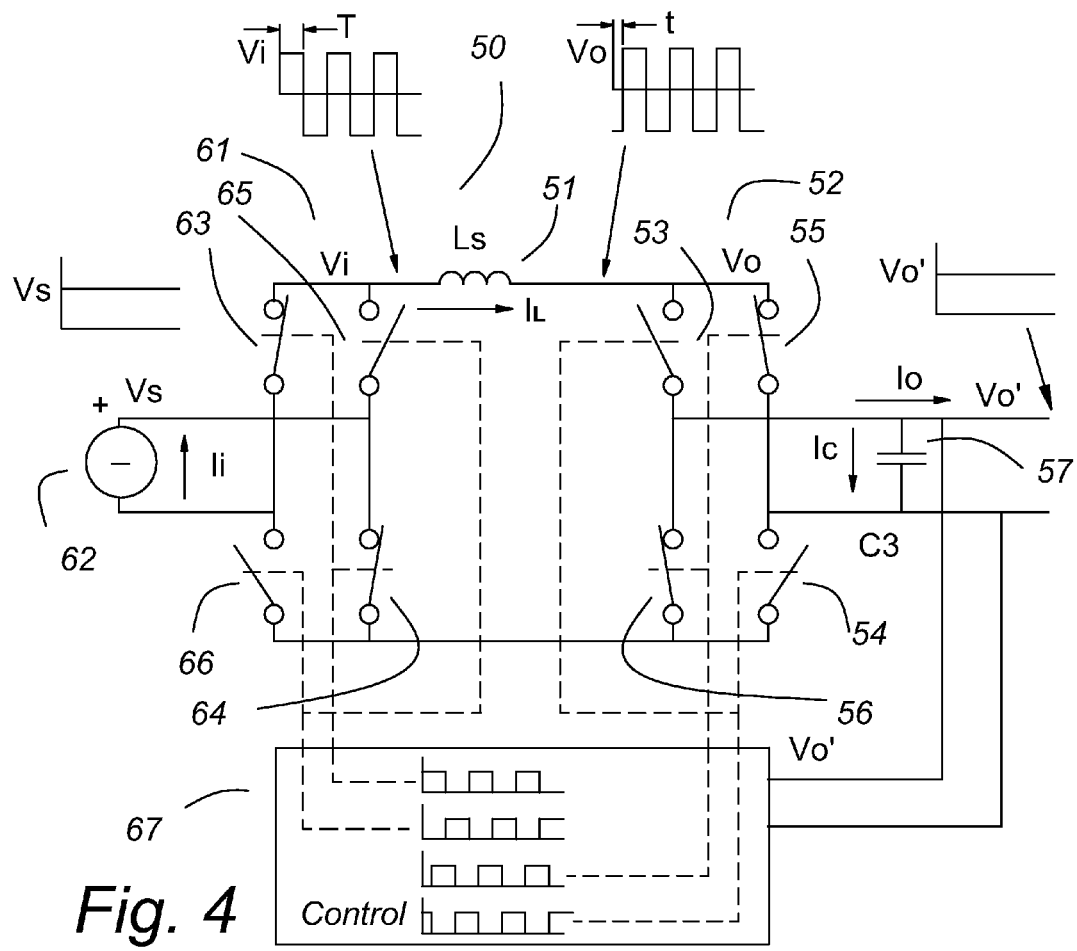
FIG. 4 shows a schematic that is the basis for a SPICE model. It has a square-wave voltage input, an inductor and a rectifier for producing a dc output voltage.

FIG. 4 shows a simplified circuit, the basis for a SPICE model. The power converter 50 comprises a source of square-wave voltage source 61 for producing a square-wave voltage Vi, an inductor 51 and a full-bridge full-bridge rectifier 52. The square-wave voltage source 61 comprises a dc voltage source and four ideal switches 63-66. The full-bridge full-bridge rectifier 52 comprises four ideal switches 53-57, operated at a 100 percent duty-ratio; that is the switches 53 and 54 are closed 50 percent of the time and switches 55 and 56 are closed the other 50 percent of the time. The alternate switch closures are mutually exclusive so not to short circuit an output capacitor 57, but one pair is always closed, so the current through the inductor 51 is never open-circuited. The magnitude of the input voltage Vi equals the magnitude of the output voltage Vo and also the magnitude of the rectified voltage Vo'. A control means 67 is responsive to the output voltage Vo' and controls the respective timing of the ideal switches 63-66 and the ideal switches 53-56. The small graphs within the control means 67 show graphically representative timing for the ideal switches 63-99 and 53-56. The exact circuits and algorithms for generating the switch driving circuits and their timing is not a point of novelty, and one skilled in the art of power converters would be able to design a suitable control circuit without undue experimentation.

For modeling, this is equal to the input full-bridge switch 2, the inductor 30, the second transformer 6, the output rectifier 8, and the output capacitor 42 of FIG. 3. The voltages, currents and impedances are reflected to one side of the transformer 7, so analytically it becomes an ideal 1:1 transformer and can be eliminated from the SPICE model. Rather than use a dc voltage source and a full-bridge switch, the source of square-wave voltage Vi is modeled in SPICE as a SPICE square-wave voltage source (not shown). The load may be modeled as a resistor (not shown) that is changed in value for different operating conditions and different tests. In some SPICE simulations, the capacitor C3 may be replaced with a SPICE voltage source, which is equivalent to an infinite capacitor with a controlled voltage Vo. The inductor current $I_L$, the output current Io and the capacitor current Ic must sum to zero under Kirchoff's current law, taking into account positions of the switches 53-56 of the rectifier 52. When the switches 53-56 change state, the inductor current $I_L$ effectively changes direction in the analysis of current flow at the capacitor C3. Since the output current Io is effectively unchanging, this results in a step change in the capacitor current Ic, as explained below.

Figure 5:
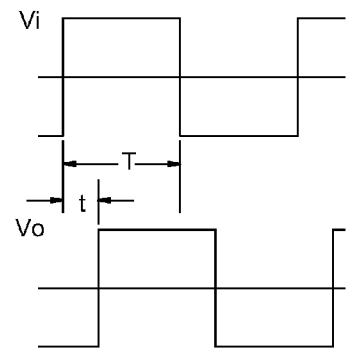
FIG. 5 defines the times T and t.
Figure 6:
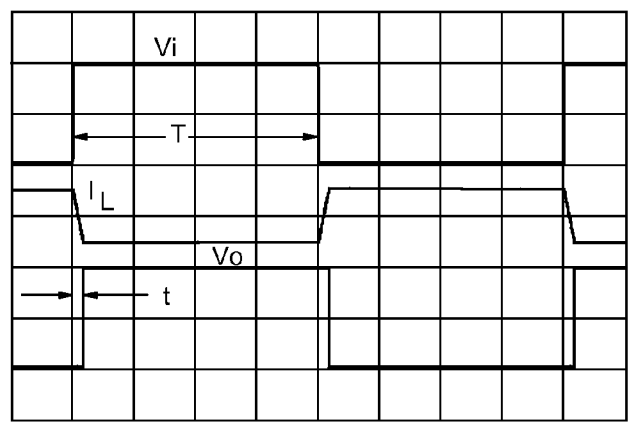
FIG. 6 shows the results of a SPICE simulation showing the relationship between Vi, Vo and the inductor current $I_L$ for a lower current. The transition time t is shorter.
Figure 7:
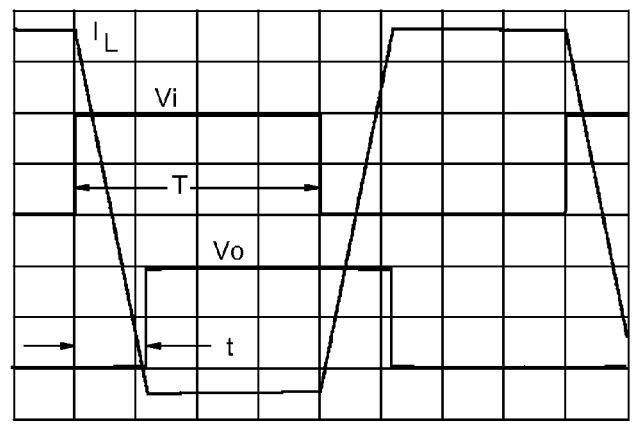
FIG. 7 shows the results of a SPICE simulation showing the relationship between Vi, Vo and the inductor current $I_L$ for a higher current. The transition time t is longer.

The timing of the change of state of the rectifier 52 of FIG. 4 is as defined in FIG. 5. The pulse width is T, and the pulse offset time (alternatively, the transition time) is t. Note that T is one half of the period, so the frequency is 1/(2*T). FIG. 6 shows the results of a SPICE simulation with a lower current $I_L$ and FIG. 7 shows the results of a SPICE simulation with a higher current $I_L$. Not shown is the condition when the rectifier is operated synchronously with the switching of the input voltage Vi, that is, with t=0. With t=0, SPICE simulation shows that the output voltage Vo' droops badly if there is a load, and the dynamic response is very poor.

The circuit is very sensitive to the offset time t, and the optimum offset time t varies with the inductor current $I_L$. As an explanation, consider the power converter 50 of FIG. 4. With synchronous operation, that is, with t=0, consider the case where there is sufficient charge on the output capacitor 57 so that the magnitudes of Vi, Vo and Vo' are equal. With synchronous switching, whenever Vi is positive, Vo is as well and there is no voltage across the inductor 51. Likewise, when Vi is negative, Vo is as well and there is no voltage across the inductor 51. Since there must be a voltage across the inductor 51 to change the current $I_L$ through it, the current remains at zero as long as charge on the output capacitor 57 is sufficient to maintain the output voltage Vo equal to the input voltage Vi, a condition that can exist only if there is no load. Given any load, the output voltage Vo' will begin to droop and the voltage across the inductor 51 alternates with a value equal to the voltage difference, Vi–Vo The inductor current $I_L$ will change, but slowly throughout the pulse width T, reversing at each half cycle.

If the operation is not synchronous, that is, t is greater than zero (t>0), during the offset time t, as defined in FIG. 5, the voltage across the inductor is Vi–(–Vo), or nominally 2*Vi. The inductor current $I_L$ changes very rapidly. However, if the offset time t is not correct, the inductor current $I_L$ undershoots or overshoots, and the errors can be significant. The offset time T may also be negative (t<0) defined as the rectifier 52 changing state before the transition of the square wave voltage Vi, as explained in more detail below.

The graphs used in the drawings are based upon SPICE simulation unless otherwise stated. The results of the SPICE simulations are displayed using the SPICE oscilloscope function, then the display is "copied and pasted" into a CAD program where it is edited for appearance only. The editing may involve adding nomenclature and reference lines, thickening the curves for better appearance in the drawings and sometimes moving them vertically so they do not lie on each other or so they are aligned vertically in a particular way to illustrate a point. The timing and scale are not changed so that the final drawing faithfully shows the results of the SPICE simulations.

A power supply topology known as a "dual active bridge" sometimes is used to regulate voltage through a transformer with sufficient leakage inductance or with added inductance.

With reference to FIGS. 4 and 5, FIG. 6 shows a SPICE simulation showing the input voltage Vi, the output voltage Vo and the inductor current $I_L$ with a lower current. The offset time t is relatively short. FIG. 7 shows a SPICE simulation showing the input voltage Vi, the output voltage Vo and the inductor current $I_L$ with a higher current. The offset time t is relatively long. Careful inspection shows that the slope $dI_L/dt$ of the inductor current $I_L$ during the respective transition times t is the same in FIGS. 6 and 7, but the required change in the current $I_L$ is significantly different, requiring a much smaller offset time t for the transition in FIG. 6.

Figure 8:
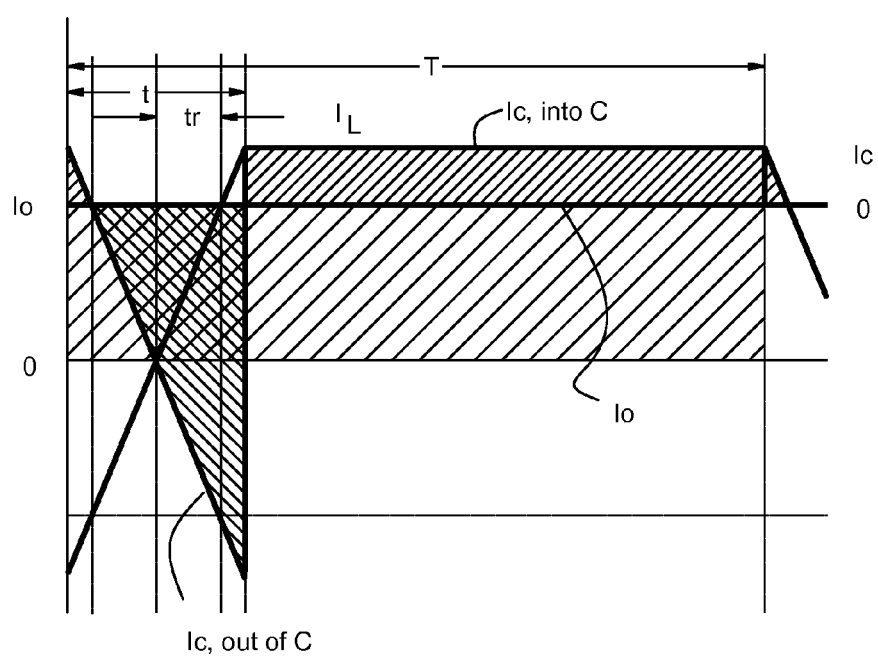
FIG. 8 analyzes the relationship between the output current Io, the inductor current $I_L$ and the capacitor current Ic, and defines the times T, t and tr.

This is further understood with reference to FIG. 8, a graph based upon a SPICE simulation of the circuit of FIG. 4. Though based upon a SPICE simulation, this graph is drawn in CAD, not copied and pasted from the SPICE simulation. FIG. 8 shows one pulse width T and the offset time t, starting with the polarity reversal of the input voltage. Initially, the full voltage difference Vi−(−Vo)=2*Vi is across the inductor 51, and the inductor current rises rapidly to its final value. Once the rectifier 52 switches, there no longer is a voltage across the inductor 51 and the inductor current $I_L$ is flat, that is, unchanging. In the SPICE simulation, the output capacitor 57 is simulated as a SPICE voltage source representing a very large (infinite) capacitor with a controlled voltage, so the rectified output voltage Vo' is steady. With a constant output voltage Vo and a steady-state load, the output current Io does not vary even as the current $I_L$ through the inductor 51 reverses. The difference current Ic is supplied by the output capacitor 57. The coarse crosshatched area indicates the area under the output current curve Io and represents the charge (coulombs) that flows to the output. The area under the inductor current curve $I_L$ is not crosshatched, but it can be visualized. While ramping, the positive area and the negative area are equal and cancel, so the net charge flowing through the inductor is the area under the flat part of the inductor current curve $I_L$. Its area, on average, must equal the area under the output current curve Io to conserve charge. Any instantaneous difference between the inductor current $I_L$ and the output current Io must flow out of or into the output capacitor 57 as the capacitor current Ic, to satisfy Kirchoff's current law. Note that the 0 reference for the capacitor current Ic in FIG. 8 is offset vertically so that it aligns with the output current Io, to emphasize their relationship, Io=$I_L$−Ic. Initially during the transition time t, for a very short time, some net current Ic flows into the capacitor, but as the inductor current $I_L$ ramps down and crosses the output current Io, the current Ic in the capacitor goes to zero, then reverses and continues flowing out of the output capacitor 57 until the rectifier 52 switches at the end of the offset time t. When the rectifier 52 switches, there is a step change in the capacitor current Ic, as explained above. The fine crosshatched areas represent the charge flowing into and out of the output capacitor 57, and the areas are equal, at steady state, as they must be to conserve charge.

Note that in FIG. 8, another time interval tr is defined. It is the time that it takes for the inductor current $I_L$ to ramp from zero to the level of the output current Io. This parameter is easy to calculate, so it forms the basis for an approximation algorithm as explained below.

The precise equation for the control algorithm, the rigorous calculation of t, given an output current Io, the inductance Ls of the inductor 51, the voltage V (Vi=Vo=V) and the pulse width T, solved in Mathcad, is very complex and only slightly more accurate than the approximation below, pointless given component tolerances.

The offset time t is calculated knowing the pulse width T, the voltage V, the output current Io and the inductance Ls. The impedance, the voltages and the currents are reflected to the same point relative to the transformer. (Vi=Vo=V is assumed). All series inductances are lumped as Ls.

First, calculate the rise time tr of the inductor current $I_L$ through Ls, as $$tr = \frac{Io * Ls}{V} \quad [1]$$

The offset time t is closely approximated as $$t = tr * \frac{T - |tr|}{T - 2*|tr|} \quad [2]$$

This can be expressed as phase shift φ in degrees as

φ=t*f*360°

For reverse current flow, that is, for negative output current Io, tr and the offset time t are negative, that is, the synchronous rectifier timing leads the input voltage square-wave timing. A negative current Io does not mean that the output voltage Vo' is negative, it is reversed current flow with a positive output voltage Vo'. The output current Io may flow in reverse from an energy storage device, an alternative power source or a regenerative load, as examples, not limitations.

Note that the transition time t is determined and applied at each transition of the square-wave voltage Vi, or twice per cycle. Accordingly, the ripple frequency will be two times the switching frequency. Precautions must be taken to ensure that the response is damped, that is, not resonant or oscillatory. If the current at one transition overshoots, and is corrected at the next transition with an undershoot, each small and successively smaller, the error will damp out. If, on the other hand, the error is sustained or grows, there will be a classic case of sub-harmonic oscillation. Since the ripple frequency is two times the line frequency, a sub-harmonic oscillation may occur at the line frequency. A consequence could be flux walking and saturation in a transformer if one is present.

Figure 9:
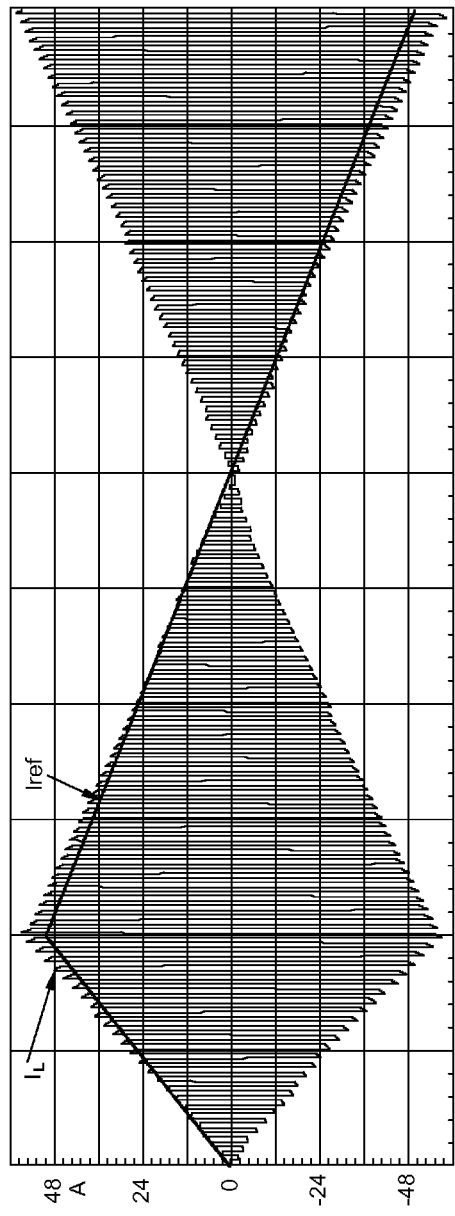
FIG. 9 shows a SPICE simulation over 100 switching cycles showing that the inductor current $I_L$ follows the current reference Iref as it ramps up, then ramps down and goes negative (reversed current flow)

FIG. 9 shows a SPICE simulation taken over 100 switching cycles. A reference curve designated Iref is set with a SPICE voltage source using the SPICE PWL function. Starting at zero, it ramps to +50 A, then ramps to −50 A. The curve designated $I_L$ shows the current $I_L$ through an inductor. Although the SPICE schematic is somewhat different, it is functionally equivalent and the inductor is analogous to the inductor 51 of FIG. 4. Ideally, the tops of the current waveform are flat, and they are at low currents in FIG. 9. The slope seen at higher currents is believed to be an artifact of the SPICE model because the function for t given by equation [2] is a function of the current reference Iref and it changes as the SPICE model is running. Also, when seen with an expanded time scale as in FIGS. 10 and 12, the slope is seen to be quite small but is exaggerated by the smaller time scale of FIG. 9.

In FIG. 9, the peak inductor $I_L$ current is larger than the current reference Iref, because Iref is the reference for the output current Io. As seen in FIG. 8, the peak current $I_L$ is larger than the output current Io. This is particularly true at relatively large currents. When imported into CAD, the CAD area function can be used to determine the average current under the curve $I_L$ when it is not transitioning, and the area under the equivalent output current Io. It is accurate within a few percent. In the SPICE function, the simulated input voltage Vi equaled the simulated output voltage Vo. Both were SPICE voltage sources. It is obvious to used a voltage source on the input, but not so obvious on the output. By holding the output voltage constant, it simulates a large (infinite) charged capacitor with a voltage Vo that is controlled by feedback.

Figure 10:
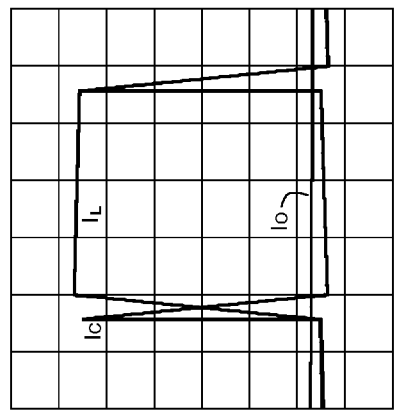

FIG. 10 shows the output current reference Iref, the inductor current $I_L$ and the capacitor current Ic from the same SPICE simulation as was used for FIG. 9 but with the capacitor current Ic added. It was not possible to generate a clear drawing of the whole current range for the capacitor current Ic as in FIG. 9, so the zoom function of the SPICE oscilloscope display was used to capture two transitions of the inductor current $I_L$ near its maximum value for FIG. 10. As in FIG. 8, the capacitor current Ic was shifted vertically in CAD to align with the inductor current $I_L$. The discussion of FIG. 8 explains the respective current flows and it is not repeated here.

Figure 11:
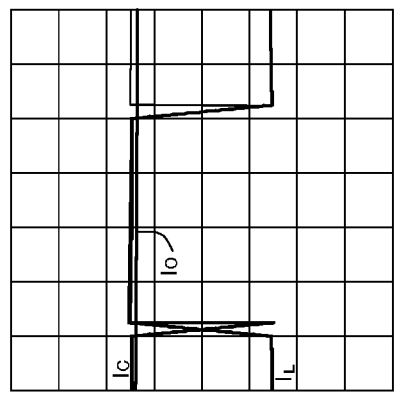

FIG. 11 shows the output current reference Iref, the inductor current $I_L$ and the capacitor current Ic from the same SPICE simulation as was used for FIG. 9. It was not possible to generate a clear drawing of the whole current range as in FIG. 9, so the zoom function of the SPICE oscilloscope display was used to capture two transitions of the inductor current $I_L$ at an intermediate value for FIG. 11. As in FIG. 8, the capacitor current Ic was shifted vertically in CAD to align with the inductor current $I_L$. The discussion of FIG. 8 explains the respective current flows and it is not repeated here.

Figure 12:
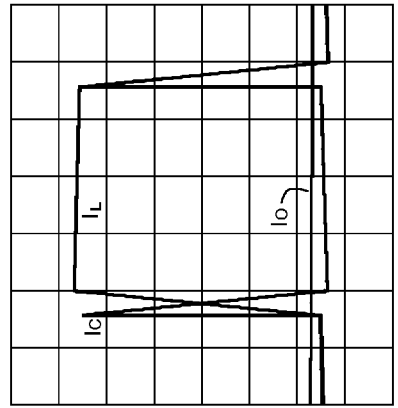
FIGS. 10 through 12 show portions of the graph of FIG. 9 with expanded time scale. A larger current, an intermediate current and a larger negative current are shown.

FIG. 12 shows the output current reference Iref, the inductor current $I_L$ and the capacitor current Ic from the same SPICE simulation as was used for FIG. 9. It was not possible to generate a clear drawing of the whole current range as in FIG. 9, so the zoom function of the SPICE oscilloscope display was used to capture two transitions of the inductor current $I_L$ at an larger negative value for FIG. 12. The negative output current reference Iref does not indicate that the output voltage is negative—it shows reverse current flow with a positive output voltage. As in FIG. 8, the capacitor current Ic was shifted vertically to align with the inductor current $I_L$. The discussion of FIG. 8 explains the respective current flows and it is not repeated here.

Figure 13:
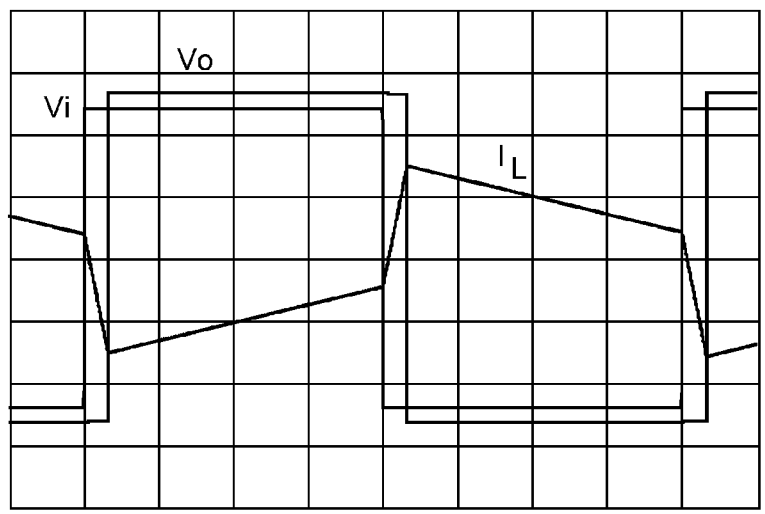
FIGS. 13 and 14 show a SPICE simulation with the input voltage lower than the output voltage (FIG. 13) and with the input voltage higher than the output voltage (FIG. 14).
Figure 14:
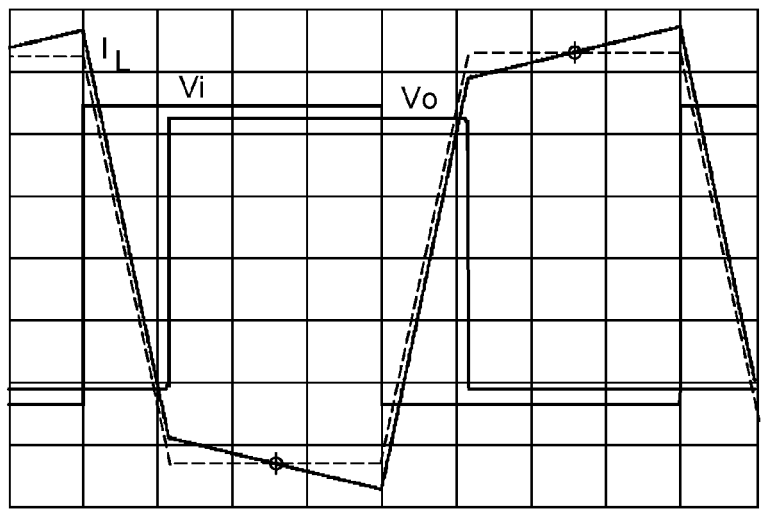

In many applications, the input voltage Vi may vary somewhat, yet it is desired to have a precisely regulated output voltage Vo. Alternatively, it may be desired to vary the output voltage Vo with a fixed input voltage Vi, or some combination thereof. The minimalized power converter of this invention has an ability to regulate the output voltage Vo for small differences from the input voltage Vi. The amount of variation that can be accommodated depends upon the specific design and design trade-offs, but plus and minus 10 percent is easily accommodated. FIGS. 13 and 14 show how the inductor current $I_L$ varies with a fixed input voltage Vi and a variable output voltage Vo.

In FIG. 13, the input voltage Vi is 48 V and the output voltage Vo is 53 V, or about 10 percent higher. With the input voltage Vi being lower than the output voltage Vo, the inductor current $I_L$ has a pronounced downward slope between transitions, as contrasted with the flat top in FIG. 8. In FIG. 14, the input voltage Vi is 48 V, and the output voltage Vo is about 44 V, or about 9 percent low. With the input voltage Vi being higher than the output voltage Vo, the inductor current $I_L$ has a pronounced upward slope between transitions. FIGS. 13 and 14 are graphs from SPICE simulations using the same model except for the output voltage Vo. However, in FIG. 14, the dashed line and point-mark were added in CAD, and represent the curve for the inductor current $I_L$ that would be found with the input voltage Vi and the output voltage Vo being equal at 48 V. The significance is that the transition time t hardly is different and the slope $dI_L/dt$ of the inductor current $I_L$ during the transition time t is very close to the same. A slight difference can be seen if the zoom function is used in CAD. It is as if the curve between the transition times pivoted about the point-mark. However, equation [1] must be re-written in a more general form if Vi≠Vo, as shown in equation [4]:

$$tr = \frac{2 * Io * Ls}{Vi + Vo} \quad [4]$$

In one embodiment of this invention, it is contemplated that the input voltage Vi may be a fairly precise square-wave. In a dc-dc transformer of conventional design, the output voltage Vo usually is fixed by the transformer turns-ratio n. In the minimalized power converter, the turns-ratio n of the transformer may be used to get as close to the desired voltage as is possible with integer turns, and the teachings of this invention may be used to make the output voltage precise at a different close voltage by controlling the offset time t.

A power supply topology known as a "dual active bridge" sometimes is used to regulate voltage through a transformer with sufficient leakage inductance or with added inductance.

The graphs in FIGS. 15 and 17 through 23 are not SPICE graphs but are drawn with CAD based upon the SPICE simulations. The underlying theory is explained in the discussion of FIG. 8 and is not repeated in detail. The graphs show some interesting fine points of the invention and the discussion of each figure is limited to the points being made in the particular figure.

Figure 15:
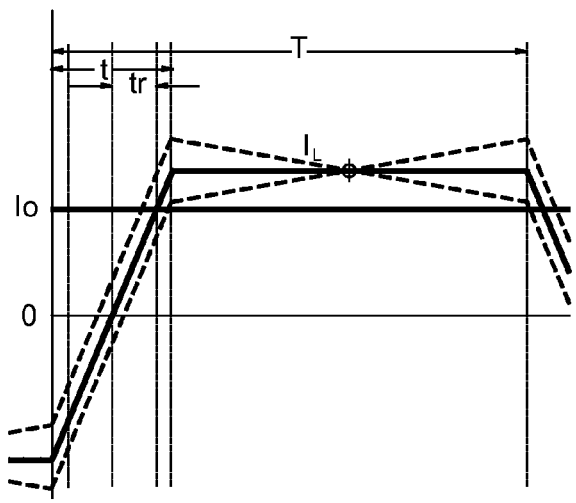
FIG. 15 is to further analyze the effects of a voltage difference between the input and the output voltages.

FIG. 15 expands upon the teachings of FIG. 14, and shows that the transition time t is not significantly affected by small differences between Vi and Vo for a given output current Io. Although the inductor current $I_L$ may start at a higher or lower value, the current to which it transitions is higher or lower as well by approximately the same amount. The change in current is approximately the same and so is the transition time t required.

Figure 16:
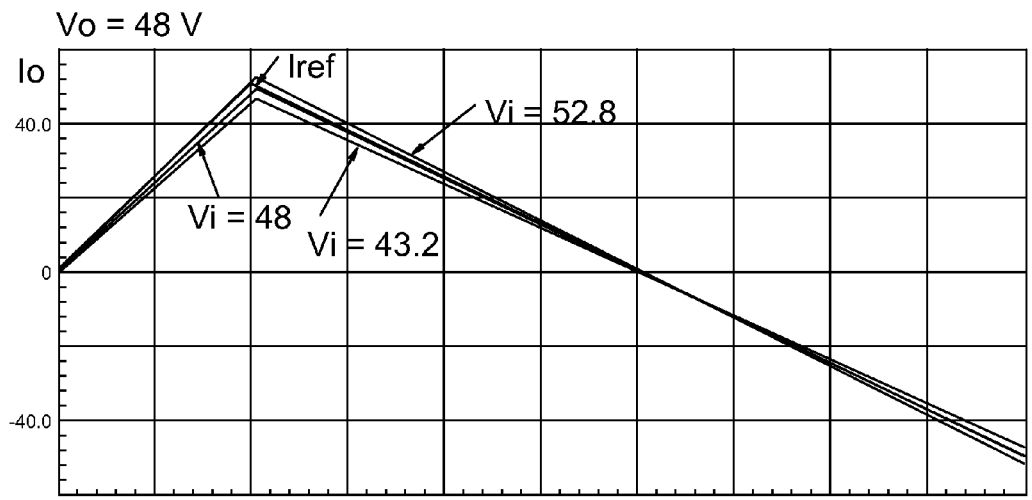
FIG. 16 shows that the output current varies slightly with changes in the input voltage.

FIG. 16 shows superimposed graphs from several SPICE simulations. The original graphs were fuzzy, and have been replaced with lines drawn in CAD, but the data is representative. The input voltage Vo was fixed at 48 V, and the input voltage Vi was varied in successive SPICE simulations as 43.2 V, 48 V and 52.8 V, 48 V plus and minus 10 percent. The reference current Iref started at zero, ramped linearly to 50 A, then ramped linearly to −50 A. Over this range, the variation of the simulated output current Io varied about 2.9 A at the peak, about 5 percent. No feedback was simulated, the SPICE simulation was of the algorithm for t alone, in accordance with equations [4] and [2].

Figure 17:
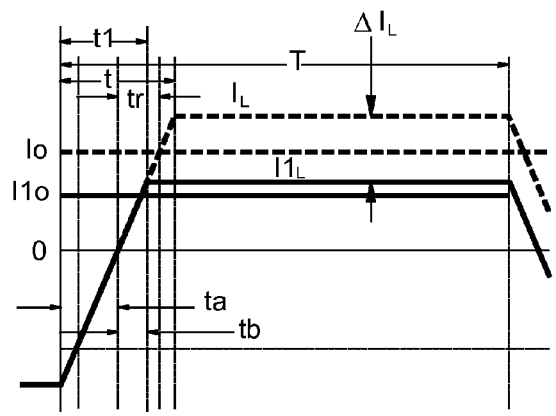
FIGS. 17 and 18 show that the inductor current $I_L$ can change very rapidly in response to a change in the output current Io, stepping down in FIG. 17 and stepping up in FIG. 18.
Figure 18:
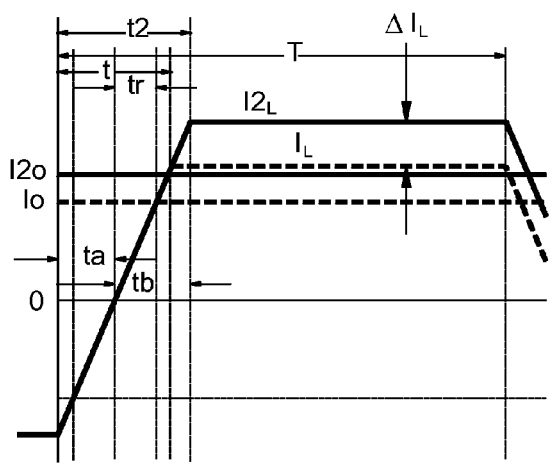

FIGS. 17 and 18 show that the output current $I_L$ can be changed very rapidly at the transition time to reflect a step change in the output current Io. The dashed line Io shows the previous output current Io and the dashed line $I_L$ shows the corresponding inductor current $I_L$. The solid line I1o shows the new output current I1o and the solid line I1$_L$ shows the new inductor current I1$_L$.

In FIG. 17, the output current Io has decreased to a new value I1o, and it is desired to transition the inductor current $I_L$ to a new value I1$_L$. The new transition time t1 is calculated as ta+tb, where ta is one half of t calculated using equations [1] and [2] with the previous output current Io and where tb is one half of t calculated using equations [1] and [2] for the new output current I1o.

FIG. 18 shows that the teachings of FIG. 17 also apply to a step increase in the output current Io to I2o. The new inductor current is $I2_L$, and the method of calculating the new transition time t2 is the same as described in the discussion of FIG. 17.

Figure 19:
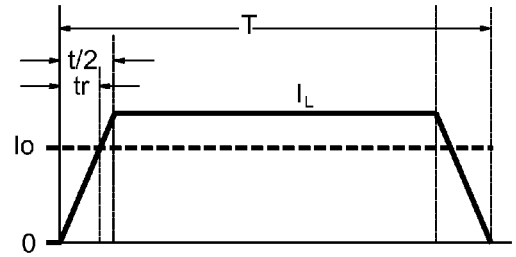
FIG. 19 shows that the inductor current $I_L$ can step rapidly from zero in response to a step change in the output current Io.

FIG. 19 shows that a similar technique can be used to step the inductor current $I_L$ from zero in response to a step change in the output current Io from zero. The transition time t/2 is one half of the transition time t calculated using equations [1] and [2].

Figure 20:
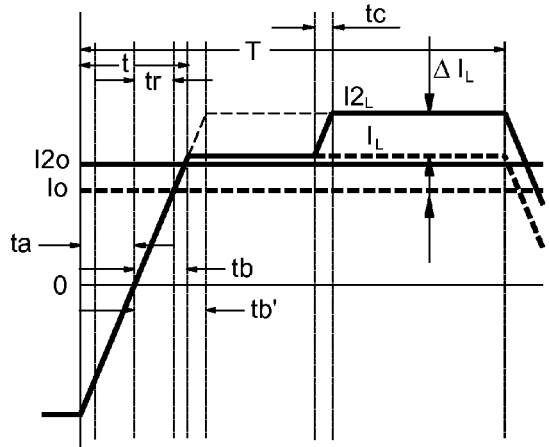
FIG. 20 shows that the inductor current $I_L$ can be stepped up mid-cycle.

FIG. 20 shows that a step change in the inductor current is not confined to the transition time of the square-wave input voltage Vi, with reference to FIG. 4. If the phase of the rectifier 52 is changed momentarily mid-cycle, the inductor current $I_L$ will increase further to $I2_L$. The transition time t3 is calculating by determining the time tb as one half of t calculated equations [1] and [2] using the previous output current Io and by determining the time tb' as one half of t calculated equations [1] and [2] using the new output current I2o. The transition time t3 is tb'–tb.

Similarly, but not shown, a step decrease in the inductor current $I_L$ can be accomplished as well, but it requires changing the phasing of the input voltage Vi. This may not be possible in some circuits, ones that are based upon a fixed square-wave input voltage Vi, but it could be done with a derectifier 2, an inductor 30, a transformer 7 and a rectifier 8 as shown in FIG. 3. (This example excludes the transformer 3 and the rectifier 4 of FIG. 3).

Figure 21:
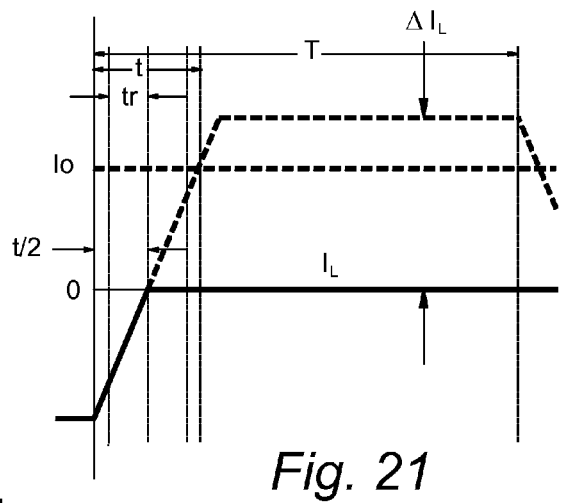
FIG. 21 shows that the inductor current $I_L$ can be stepped to zero.

FIG. 21 shows that the inductor current $I_L$ can be transitioned to zero by using a transition time t/2, where t is calculated using equations [1] and [2] using the previous output current Io.

Figure 22:
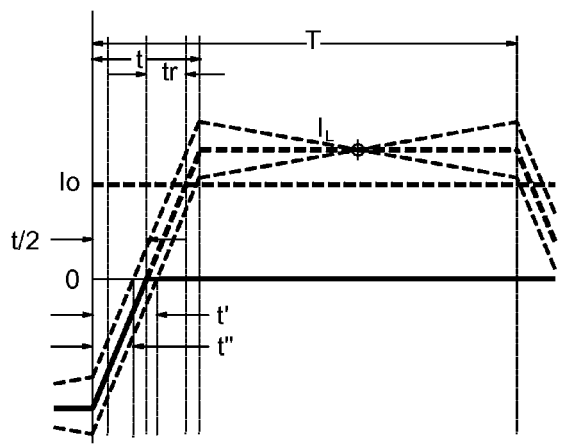
FIG. 22 shows that voltage differences can affect the transition time when stepping the inductor current $I_L$ to zero.

FIG. 22 shows that applying a transition time of t/2, where t is determined by equations [1] and [2], does not bring the inductor current $I_L$ to zero if there is a significant voltage difference between the input voltage Vi and the output voltage Vo, shown as the inductor current $I_L$ following one of the lighter dashed lines, with reference to FIGS. 14 and 15. In many applications, the algorithm would not be relied upon, and the inductor current $I_L$ can be brought quickly to zero by sensing zero crossing to determine the correct transition time t, approximately t/2.

Figure 23:
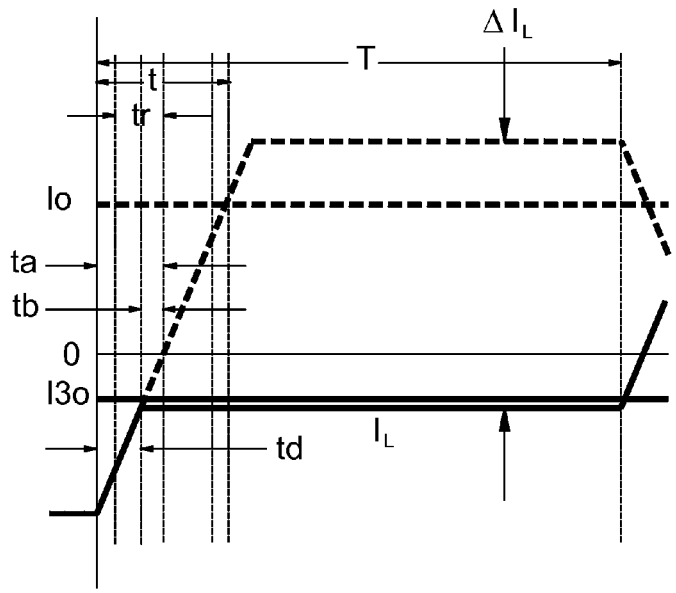
FIG. 23 shows that the inductor current $I_L$ can reverse in response to a reversal of the output current Io. In normal operation, the inductor current $I_L$ reverses at each half cycle of the switching frequency. When it does not, the output current Io reverses polarity.

FIG. 23 shows that the inductor current $I_L$ can transition to a new value of opposite sign (reversed current flow) by terminating the transition time t before its midpoint ta=t/2 as calculated by equations [1] and [2]. Although the inductor current $I_L$ was and remains negative, the inductor current is rectified, so successive half pulses are normally of opposite polarity. When terminated early, before crossing zero, before the mid-point of t as calculated by equations [1] and [2], the polarity reverses. In FIG. 23, Io was positive and transitions to negative, but the same technique can transition the other way.

The very fast transitions of the inductor current $I_L$ described above may be less useful in minimalized power converters using voltage feedback due to stability issues. Total charge measurement, as taught in U.S. Pat. No. 7,394,230 may provide feedback that is fast enough, but the preferred use of very fast current transition may be in cases where an external source provides intelligence about a rapid change of current. As examples, not limitation, a processor may signal in advance a change of mode or a power source may signal in advance that it is coming on-line or turning off.

Figure 24:
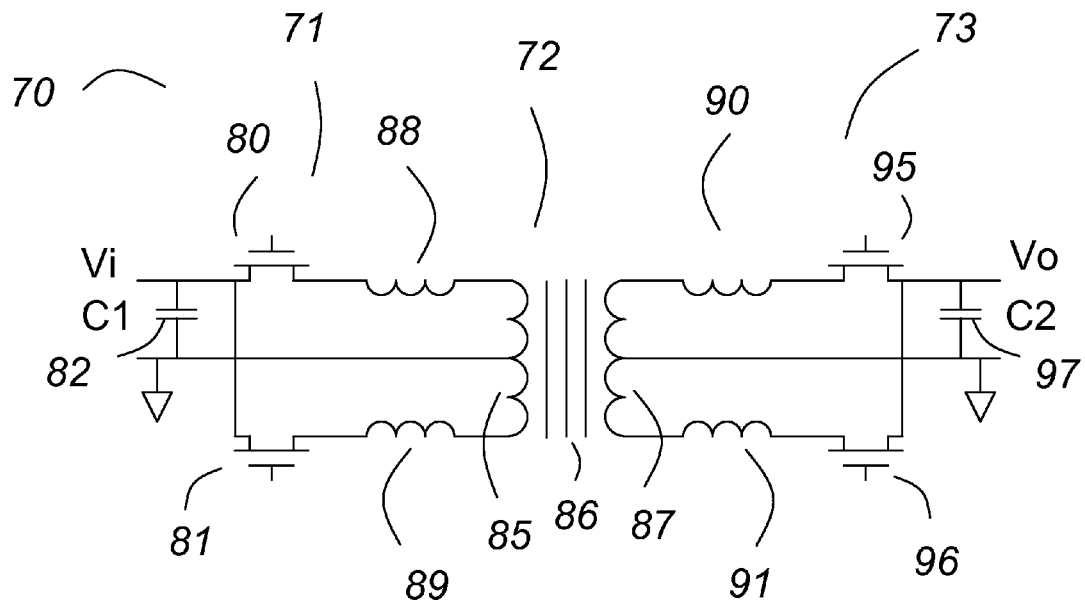
FIG. 24 shows a prior art dc-dc transformer having push-pull switches and a push-pull rectifier. The leakage inductances are shown.

FIG. 24 shows a prior art dc-dc transformer 70 comprising a full-bridge switch 71, a transformer 72 and a rectifier 73. An input capacitor 82 and an output capacitor 97 provide filtering. The full-bridge switch 71 is shown as a push-pull switch comprising two switches 80 and 81 shown as an example, not a limitation, as MOSFETs. The transformer 72 comprises a primary winding 85, a transformer core 86 and a secondary winding 87. The primary winding 85 and the secondary winding 87 are shown as push-pull windings. The rectifier 73 is shown as a push rectifier comprising two switches 95 and 96 shown as an example, not a limitation, as MOSFETs. Also shown are parasitic inductances 88 through 91, lumped inductances including stray and leakage inductance of the primary and secondary windings 85 and 87.

Push-pull windings as shown in FIG. 24 present a problem for the teachings of this invention unless the coupling is nearly ideal between the inductances 88 and 89 of the primary winding 85 and the inductances 90 and 91 of the secondary winding 87. Some circuits, such as the power converter 1 of FIG. 1 have only one push-pull winding 22, but the same consideration applies. In the full-bridge switch 71, when one of the switches 80 or 81 is opened, the uncoupled inductance will cause voltage spiking and the inductor current does not transition neatly as in FIG. 8. With very good coupling, as by using bi-filar or interleaved windings, satisfactory operation may be possible, but full-bridge switches and rectifiers are preferred. U.S. Pat. No. 7,394,135 may be useful to reduce uncoupled stray inductance.

Full-bridge rectifiers are not preferred for low voltage, high current rectifiers due to the voltage drop through two switches. For all full-bridge rectifiers, there is the problem of low side and high side drivers, which add complexity to a circuit. A solution for the teachings of this invention may be found in the tutorial "Design and Application of Matrix Transformers and Symmetrical Converters," a U.S. provisional patent application Ser. No. 61/349,289, filed May 28, 2010 and entitled "Interleaved Current Doubler with Common Mode Capacitors," and U.S. patent application Ser. No. 13/118,676 filed May 31, 2011 and entitled "Interleaved Current 'doubler with Common Mode Capacitors." The term "Current Doubler' is now regarded as mistaken and the title will likely be amended.

Figure 25:
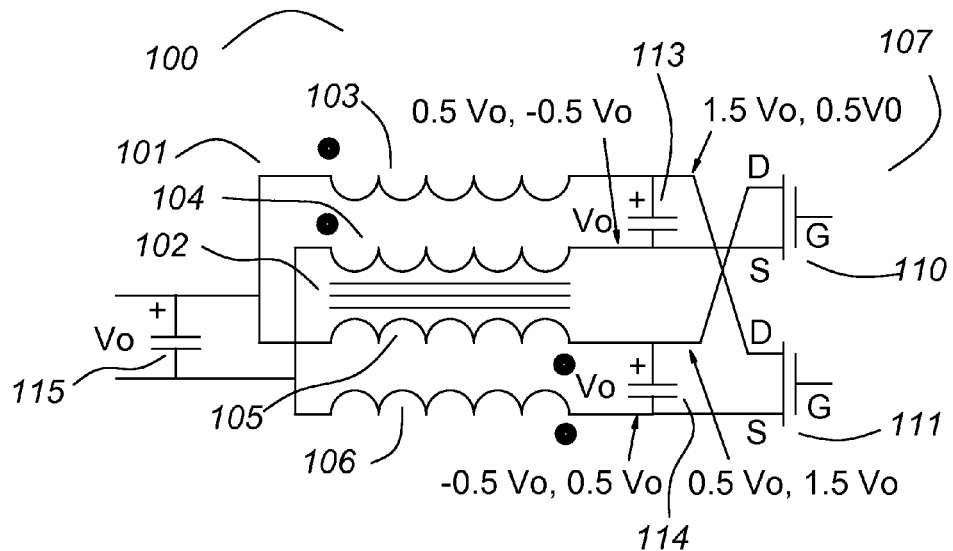
FIG. 25 shows a representative secondary circuit for a symmetrical push-pull transformer winding with common mode capacitors, from U.S. 61/349,289.
Figure 26:
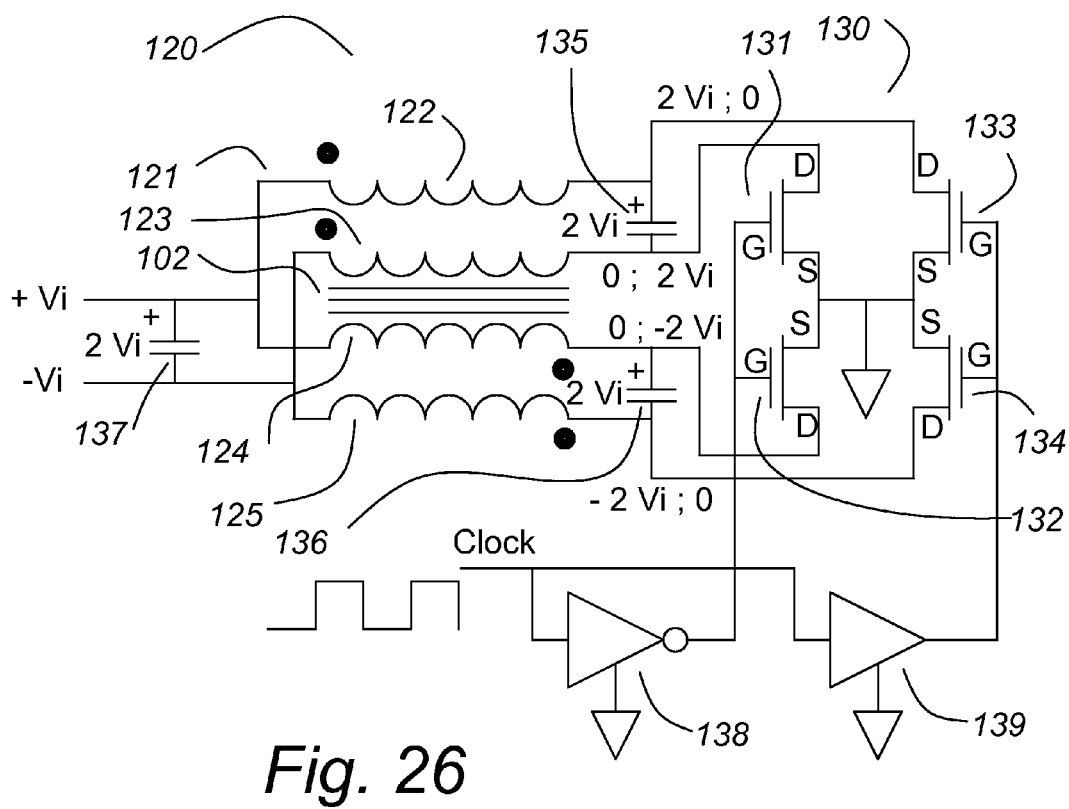
FIG. 26 shows a representative primary circuit with a ground referenced full-bridge from the same provisional application.

FIGS. 25 and 26 show circuits from '289. FIG. 25 is derived from a drawing therein, and FIG. 26 is copied, with edits including reference designators. FIG. 25 shows a symmetrical push-pull transformer 100 with a symmetrical push-pull primary winding 101 with common mode capacitors 113 and 114, which is a secondary circuit. FIG. 26 shows a full-bridge symmetrical push-pull transformer circuit 120 which is a primary circuit. The symmetrical push-pull transformer 101 with a common transformer core 102 shows that they are different windings of the same transformer 101, the windings being illustrated separately to keep the drawings less cluttered.

FIG. 25 shows the symmetrical push-pull transformer 100. The primary circuit is not shown to simplify the drawing, but a representative primary circuit can be seen in FIG. 26. The symmetrical push-pull transformer 100 comprises a secondary winding 101 comprising four windings 103-105, a push-pull rectifier 107 comprising two switches 110 and 111, shown as MOSFETs as an example, not a limitation, that cross couple the four windings 103-105 and common mode capacitors 113 and 114 that effectively decouple the switches 110 and 111 from the leakage inductance of the transformer 101 and have equal common mode voltages. The common mode voltages of the common mode capacitors 113 and 114 is the same as the output voltage Vo on an output filter capacitor 115. A more complete explanation may be found in the tutorial and '289, but the most important features for this invention is that the switches 110 and 111 are on the opposite end from the output, for switching noise attenuation and that the common mode capacitors 113 and 114 couple the windings 103-105 such that all of the windings conduct reversing currents as in a full-bridge winding, not just one half at a time as in a legacy push-pull winding as shown in the rectifier 4 of FIG. 1. The common inductance of the windings 103-105 are preferably well coupled by the mechanical design of the transformer 101, but it is more completely coupled by sharing equal currents. The more complete coupling of the common inductance is enabling technology for this invention for applications where a full-bridge winding is not preferred.

FIG. 25 also shows the voltages that appear on selected nodes of the circuit. Two voltages are shown for each node separated with a comma. The two voltages are for the two states of the switches 110 and 111, the first being when the switch 110 is on and the other being when the switch 111 is on. When operated with 100 percent duty-ratio, as is preferred, one switch or the other is always on. (There may be a very small interval when both are off, to prevent shoot-through.)

FIG. 26 shows the full-bridge symmetrical push-pull transformer 120. The secondary circuit is not shown to simplify the drawing, but a representative secondary circuit can be seen in FIG. 25. The full-bridge symmetric push-pull transformer 120 comprises a primary winding 121 comprising four windings 123-125, a full-bridge switch 130 comprising four switches 131-134, shown as MOSFETs as an example, not a limitation, cross couple the four windings 103-105 and common mode capacitors 135 and 136 that effectively decouple the switches 131-134 from the leakage inductance of the transformer 101 and have equal common mode voltages. The common mode voltages 2*Vi of the common mode capacitors 135 and 136 is the same as the voltage 2*Vi on an input filter capacitor 137. Note that the input voltage is from balanced +Vi and −Vi, adding to 2*Vi. A more complete explanation may be found in '289, but the most important features for this invention is that the switches 131-134 are on the opposite side from the input, for switching noise attenuation and that the full-bridge switch 130 has ground referenced switches 131-135 that do not require high side and low side drivers as does the full-bridge switch 2 of FIG. 1. The common inductance of the windings 122-125 are preferably well coupled by the mechanical design of the transformer 101, but it is more completely coupled by sharing equal currents. The switches 131-134 are driven by ground referenced drivers as illustrated by drivers 138 and 139 as illustrations, not limitations.

FIG. 26 also shows the voltages that appear on selected nodes of the circuit. Two voltages are shown for each node separated with a comma. The two voltages are for the two states of the switches 131-134, the first being when the switches 131 and 132 are on and the other being when the switches 133 and 134 are on. When operated with 100 percent duty-ratio, as is preferred, one pair of the switches or the other is always on. (There may be a very small interval when all of the switches 131-134 are off, to prevent shoot-through.)

When the symmetrical push-pull secondary winding 101 of FIG. 25 is used with the ground referenced symmetrical push-pull full-bridge primary winding 121 of FIG. 26 on the same transformer, there is no obvious point where a discrete inductor can be placed, unless the inductor has four coupled inductor windings, with one of the coupled inductor winding in series with each of the primary windings 122-125. This may be practical on the high voltage side, and the coupling is enhanced because all four of the windings 122-125 conduct for both states of the switches. Alternatively, the design may use the inherent leakage inductance of the transformer 101. Especially with printed wiring windings, the leakage inductance is reasonably well controlled and repeatable in a well designed and well built transformer.

There is no problem using the symmetrical push-pull secondary winding 101 of FIG. 25 if a conventional full-bridge switch, such as the full-bridge switch 2 of FIG. 3 is used with a single primary winding to excite the transformer. A discrete inductor can be placed in series with the single primary winding. Similarly, there is no problem using the ground referenced symmetrical push-pull full-bridge primary winding 121 of FIG. 26 if a conventional full-bridge rectifier such as the rectifier 52 of FIG. 4 is used with a single secondary winding. A discrete inductor can be placed in series with the single secondary winding.

As would be well understood by one skilled in the art of power conversion, the switches 110 and 111 of FIG. 25 and the switches 131-134 require drivers, logic and timing circuits that are not shown or are shown only as logic symbols. The design of the drivers, logic and timing circuits are not points of novelty of this invention and so are not shown to avoid clutter in the drawings. Notwithstanding, the timing circuits are intended to use the teachings of this invention to determine the transition time t as explained above using equations [1], [2] and [4] as applicable.

A power supply topology known as a "dual active bridge" sometimes is used to regulate voltage through a transformer with sufficient leakage inductance or with added inductance. To the best of my knowledge and belief, the dual active bridge is not and cannot be used with conventional push-pull windings. This invention teaches using symmetrical push-pull windings on the primary or the secondary.

The minimalized power converter may limit the output current Io for overload conditions. Given a voltage across the inductor, the amount that the current can change is limited by the transition time t, which, in turn, cannot be larger than the pulse width T, with reference to FIG. 5. A SPICE simulation is shown in U.S. 61/349,289.

Figure 27:
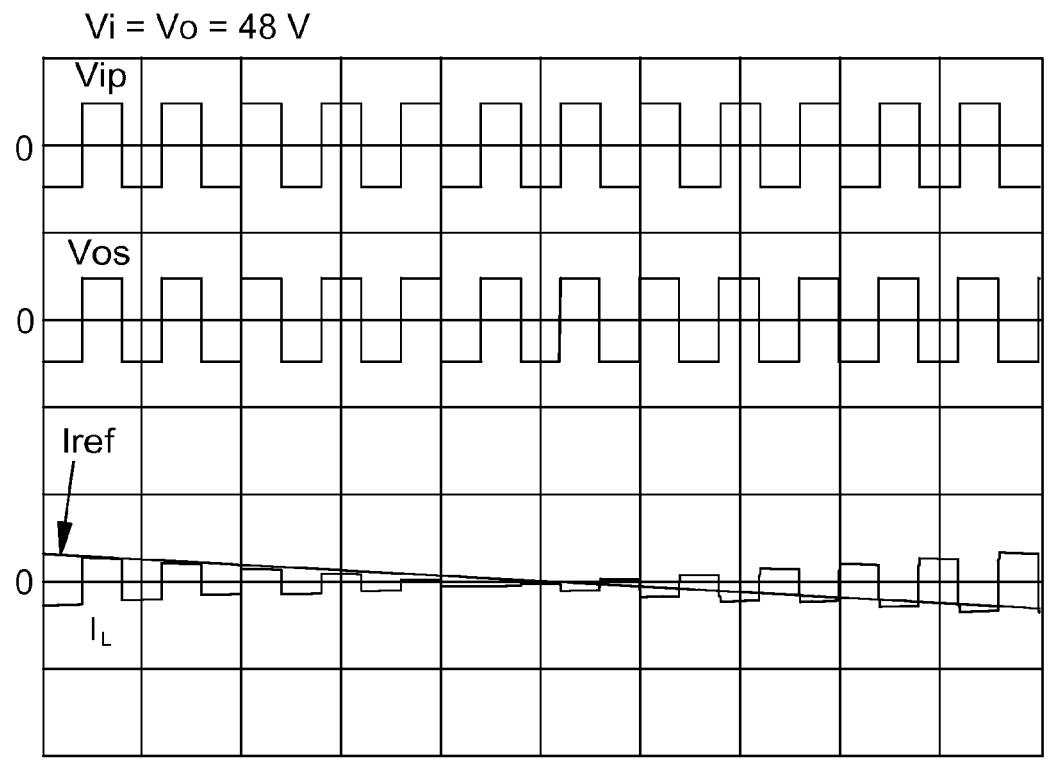
FIGS. 27 and 28 show SPICE simulations of the same model.
Figure 28:
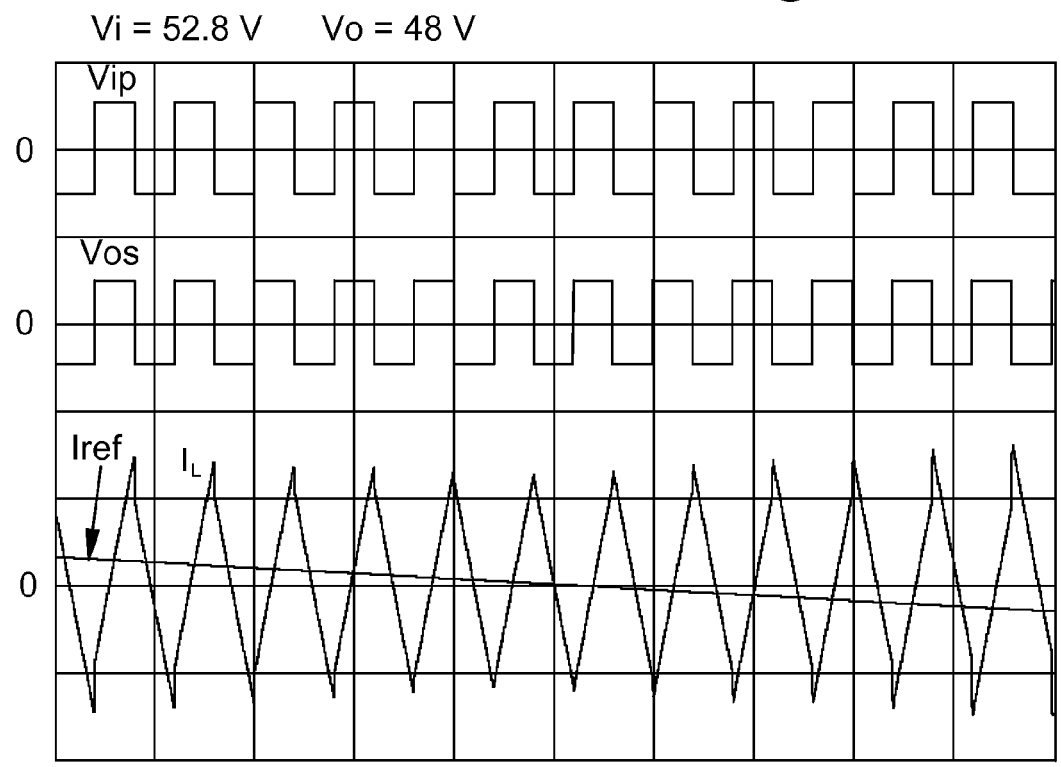

It is preferred that the input voltage Vi be close to the output voltage Vo, it being understood that the voltages are reflected through the transformer to the same point. That is, either the real input voltage Vi is divided by n, the transformer turns-ratio, to reflect it to the secondary, or the real secondary voltage Vo is multiplied by n to reflect it to the primary. FIGS. 27 and 28 show that this is particularly important if the minimalized power converter is to be operated at low loads or no load.

In theory, with Vi=Vo and the full-bridge switch and rectifier operating synchronously, that is, the transition time t equals zero, no current will flow through the inductor L, with reference to FIGS. 4, 5 and 8. FIG. 27 shows that condition. The peak inductor current $I_L$ tracks the reference current Iref quite closely, going to zero as Iref goes to zero. However, if Vi≠Vo, the voltage difference is across the inductor L, first in one polarity, then the other. See FIGS. 13 to 15. The inductor current $I_L$ under this condition is shown in FIG. 28. The net inductor current $I_L$ is zero when the reference current Iref is zero, but that is only because fairly significant positive and negative peak currents are equal in magnitude and sum to zero. The size of the peak currents depends upon the specific design and design trade-offs, but it is determined mainly the inductor size, the voltage difference between Vi and Vo (reflected to the same point relative to the transformer) and the pulse width T, with reference to FIG. 5.

The preferred mode of operation for applications that operate at low load and where efficiency at low load is important is with Vi nominally equal to Vo (reflected to the same point relative to the transformer) at no load conditions. The minimalized power converter can then correct for load regulation to have a precise output voltage Vo, noting that with no load, the error due to load regulation is zero, in theory. It can also correct for momentary input voltage transients, and if they are brief, the momentary additional efficiency loss is not very important.

Figure 29:
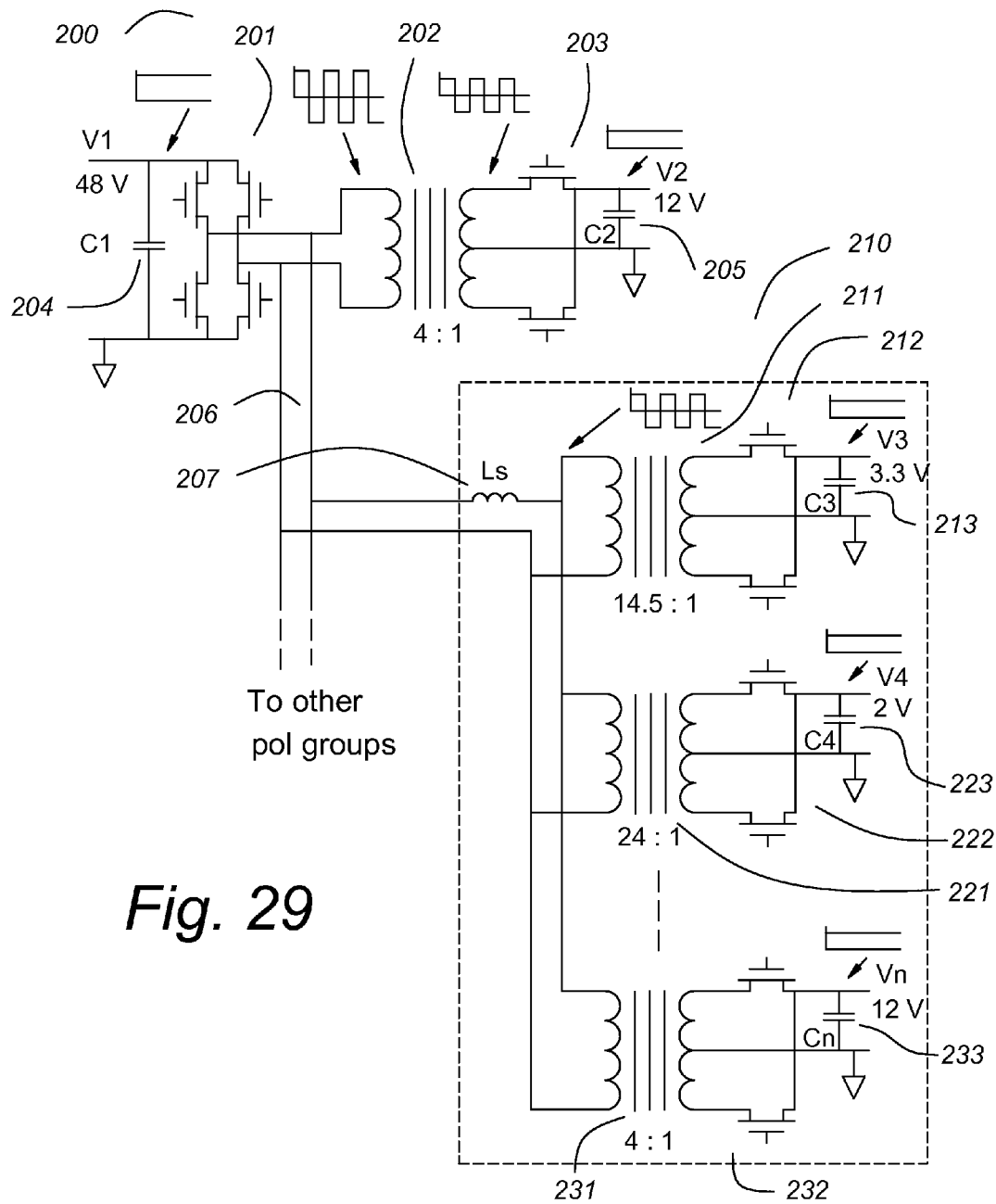
FIG. 29 shows a high frequency square-wave power distribution system system with a pol group with multiple output voltages.

FIG. 29 shows one embodiment of an expanded high frequency square-wave power distribution system system 200. A full-bridge switch 201 switches full-wave an input voltage V1, shown as 48 V as an example, not a limitation. The components of the full-bridge switch 201 and other sub-circuits are not enumerated in FIG. 29 because they are described in the discussion of previous figures and doing so would add nothing important to the teachings of the invention. The full-bridge switch 201 may provide excitation to a transformer 202, shown as a 4:1 transformer as an example, not a limitation. The output of the transformer 202 may be rectified by a rectifier 203 to provide a 12 V dc output V2, as an example, not a limitation. The 12 V dc output V2 may provide power to legacy point of load (pol) power converters that require a 12 V dc input, as an example, not a limitation. An input filter capacitor 204 may provide decoupling and ensure that the input voltage V1 has a low source impedance at high frequencies, as would be well understood by one skilled in the art of power converters.

This invention contemplates using an ac power distribution link 206 to power other pols or pol groups. The output of the full-bridge switch 201 is suitable and is used in the example of FIG. 29. As an alternative, any other winding of the transformer 202 may be used, or any tap of any winding. This provides a variety of ac link source voltages without further conversion, and they may be used in any combination.

If an ac power distribution link 206 has significant length, it will have stray inductance, shown as an inductor 207. For analytical purposes, the inductor 207 is a lumped inductor and includes all stray and leakage inductances that are effectively in series. In FIG. 29, a branch of the ac power distribution link 206 provides power to a pol group 210 comprising an indefinite number n of transformers 211, 221 and 231, n rectifiers 212, 222 and 232 to provide n output voltages V3, V4 and Vn. The designation Vn and the dashed line between transformers 221 and 231 indicated that an indefinite number of pols may be used in the pol group 210 to provide a variety of output voltages. Alternatively, any of the transformers 211, 221 or 231 may have additional secondary windings or tapped secondary windings with additional rectifiers to provide additional output voltages as would be understood by one skilled in the art of transformers.

Ideally, a transformer has no stray or leakage inductance, and some transformers have sufficiently low stray and leakage inductance that it can be disregarded. Transformers made in accordance with U.S. 61/349,289, U.S. Pat. No. 7,394,135 or U.S. Pat. No. 7,119,648 have particularly low stray and leakage inductance and may be enabling technology for this invention.

In the example of FIG. 29, the transformers 202, 212, 222 and 232 are considered to have low stray and leakage inductance, sufficiently low that the inductor 207 dominates. However, another factor within the pol group 210 is helpful. Although the ac power distribution link 206 may be lengthy enough to have significant stray inductance, it is contemplated that within the pol group 210 low inductance interconnection means such as a multilayer printed wiring board may be used with very low inductance transformers mounted thereon. Within the pol group 210, the stray and leakage inductance of the transformers 212, 222 and 213 are in parallel. The respective outputs of the rectifiers 212, 222 and 232 may have output capacitors 213, 223 and 233, and they will reflect through their respective transformers rectifiers as parallel capacitances at the ac link. When inductors are paralleled, the net inductance is reduced as the sum of the inverse inductances (1/L). When capacitors are paralleled, the capacitance is increased as the sum of the capacitances.

The concept that the capacitors 213, 223 and 233 are effectively paralleled through the rectifiers 212, 222 and 232 and the transformers 211, 221 and 231 may not be obvious, but if any path between the capacitors is analyzed, it will be seen to be the equivalent of a dc-dc transformer except for having two transformers and an ac link. The capacitors are effectively coupled and either can be reflected to the other as the square of the effective turns-ratio between them. The respective capacitor voltages reflect as the effective turns-ratio between them. If there are two transformers in series, the effective turns-ratio is the product of the individual turns-ratios, as would be understood by one skilled in the art of transformers.

A consequence of this is that if the voltage on one of the linked capacitor is too high, higher than it should be considering the linkage between them, charge will be transferred to the other until equilibrium is reached. With three capacitors, as in the pol group 210 shown, or more, in a generalized pol group, all of the output capacitors are effectively in parallel, together forming a "collective capacitance" equal to their sum as reflected to a common point relative to the transformers.

For control purposes, the voltage of any one output can be used for feedback, and the other voltages will track, albeit with some cross regulation. In this scenario, all of the rectifiers 212, 222 and 232 are operated synchronously with a transition time t relative to the ac link voltage square wave, using the common inductor 207 for the algorithm of equations [1], [2] and [4] if desired. It may be preferred to use the algorithm for feedforward, fine tuned using feedback, to increase the response to transients and to reduce the phase margin. Using the algorithm strictly requires measuring all of the output currents, reflecting them to a common point relative to the transformers and summing them. However, if one load dominates, it may be sufficient to measure that one alone as an approximation. The design is quite flexible and many trade-offs are available for optimization for a particular application.

The use of total charge control as taught in U.S. Pat. No. 7,394,230 may provide better control and faster response. In '230, the charge error of each capacitor is used for feedback control by weighting a summing resistor at each capacitor as the inverse of its capacitance. In the pol group of 210, all of the output voltages have a common ground reference, which is helpful. All of the output voltages must be attenuated to a common voltage as by a resistor divider on each output capacitor and it is the impedance of the resistor divider looking back from the summing point that is weighted as the inverse of its associated capacitance.

Figure 30:
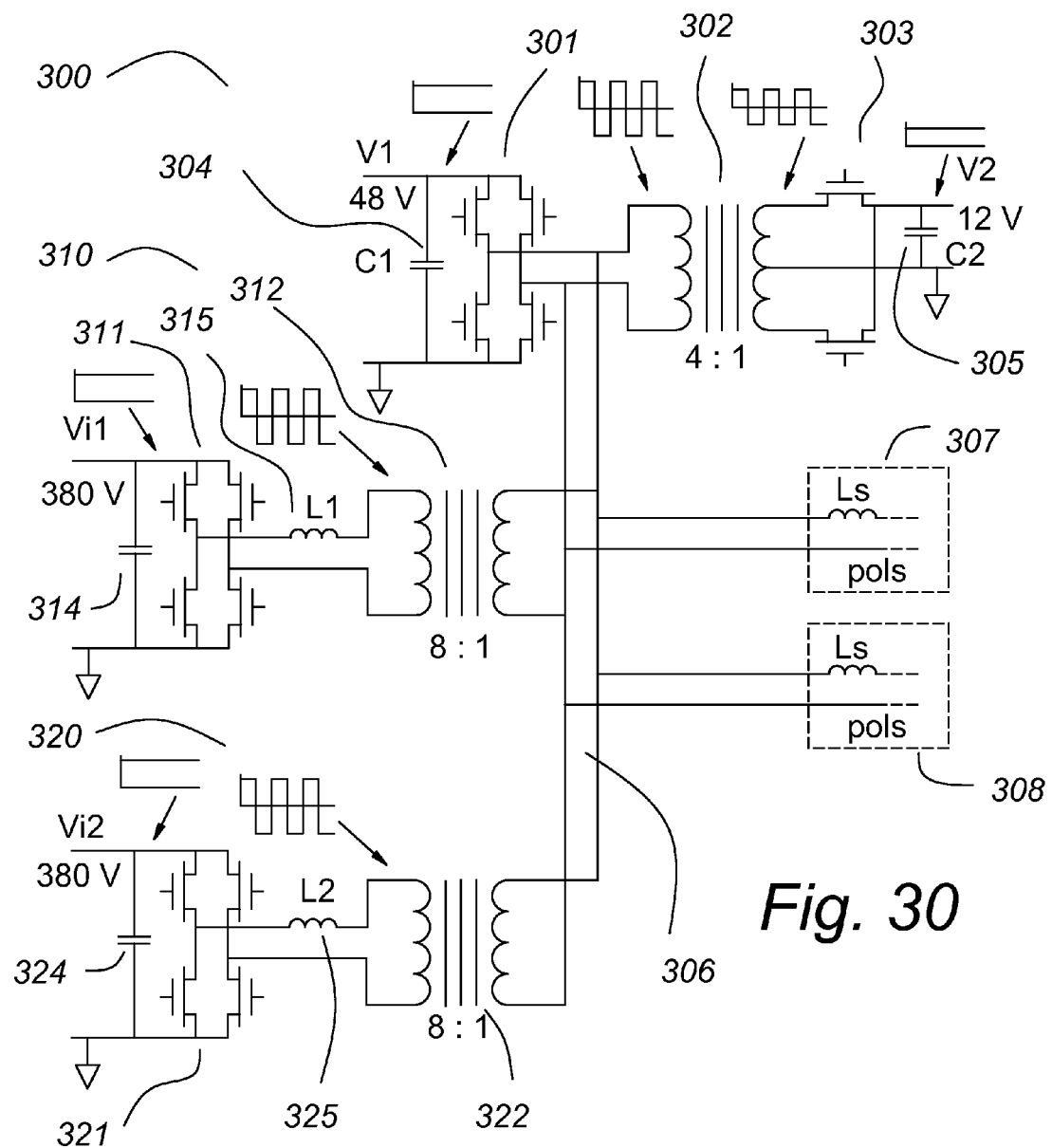
FIG. 30 shows that the high frequency square-wave power distribution system can be used to control the input current from redundant input voltage sources.

FIG. 30 shows that additional inputs may be accommodated as well as additional outputs. A full-bridge switch 301 switches full-wave an input voltage V1, shown as 48 V as an example, not a limitation. The components of the full-bridge switch 301 and other sub-circuits are not enumerated in FIG. 30 because they are described in the discussion of previous figures and doing so would add nothing important to the teachings of the invention. The full-bridge switch 301 may provide excitation to a transformer 302, shown as a 4:1 transformer as an example, not a limitation. The output of the transformer 302 may be rectified by a rectifier 203 to provide a 12 V dc output V2, as an example, not a limitation. The 12 V dc output V2 may provide power to legacy point of load (pol) power converters that require a 12 V dc input, as an example, not a limitation. An input filter capacitor 304 may provide decoupling and ensure that the input voltage V1 has a low source impedance at high frequencies, as would be well understood by one skilled in the art of power converters.

This invention contemplates using an ac power distribution link 306 to power other pols or pol groups. The output of the full-bridge switch 301 is suitable as an ac link 306 and is used in the example of FIG. 30. As an alternative, any other winding of the transformer 302 may be used, or any tap of any winding. This provides a variety of ac link source voltages without further conversion, and they may be used in any combination. Generic pols 307 and 308 are shown, and may be similar to the collective pol 210 of FIG. 29 or any of many other configurations using the teachings of this invention.

The ac power distribution link 306 may also receive power from additional sources. In FIG. 30, two minimalized input current control circuits 310 and 320 receive power from respective dc voltage sources Vi1 and Vi2. The dc voltage sources Vi1 and Vi2 connect, respectively, to full-bridge switches 311 and 321. The full-bridge switches 311 and 321 in turn connect respectively through inductors 315 and 325 to transformers 312 and 322. In analyzing the current flow from the voltage sources Vi1 and Vi2, equations [1], [2] and [4] are used. The pulse width T is defined by the square wave ac voltage on the ac link 306, and that in turn is controlled by the full-bridge switch 301 and the voltage source V1. Given that V1 is 48 V dc, as an example, not a limitation, the ac link voltage is a 48 V ac square-wave. The amplitude is quite precise as only the voltage drops of the full-bridge switch 301 separate it from the voltage V1 and the capacitor 304.

The current flow through the two minimalized input current control circuits 310 and 320 are analyzed in the same way as voltage sources deriving power from the ac link except that the current flow is reversed, that is, the current Io in equations [1] and [4] is negative. Therefore, the transition time t is negative, indicating that the full-bridge switches 311 and 321 switch before the full-bridge switch 301. Each of the full-bridge switches 311 and 321 is independently controlled, so the current flowing through them is independently controlled and can be divided between them in any proportion.

Also, for analysis, the ac link is a common node, and the sum of the currents flowing into it is zero, by Kirchoff's law. In FIG. 30, current can flow into the ac link from V1, Vi1 or Vi2. Usually, current will flow out of the ac link through any of the connected pols or the transformer 302 and the rectifier 303. However, V1 may be a battery, and current flow may be reversed to charge the battery, as an example, not a limitation. Some loads are overrunning, so it is possible that some of the pols will return current to the ac power distribution link. Current will also flow from or to any of the capacitors that are connected to the ac link through synchronous full-bridge witches or rectifiers, either directly or through transformers, during the transition times and if there is a voltage inequality in the several voltages as reflected to the ac link. In general, it would be preferred that current not flow backwards out of the two minimalized input current control circuits 310 and 320, so these inputs may incorporate diodes to prevent reverse current flow in the event of a power failure of either of the voltage sources Vi1 or Vi2.

Figure 31:
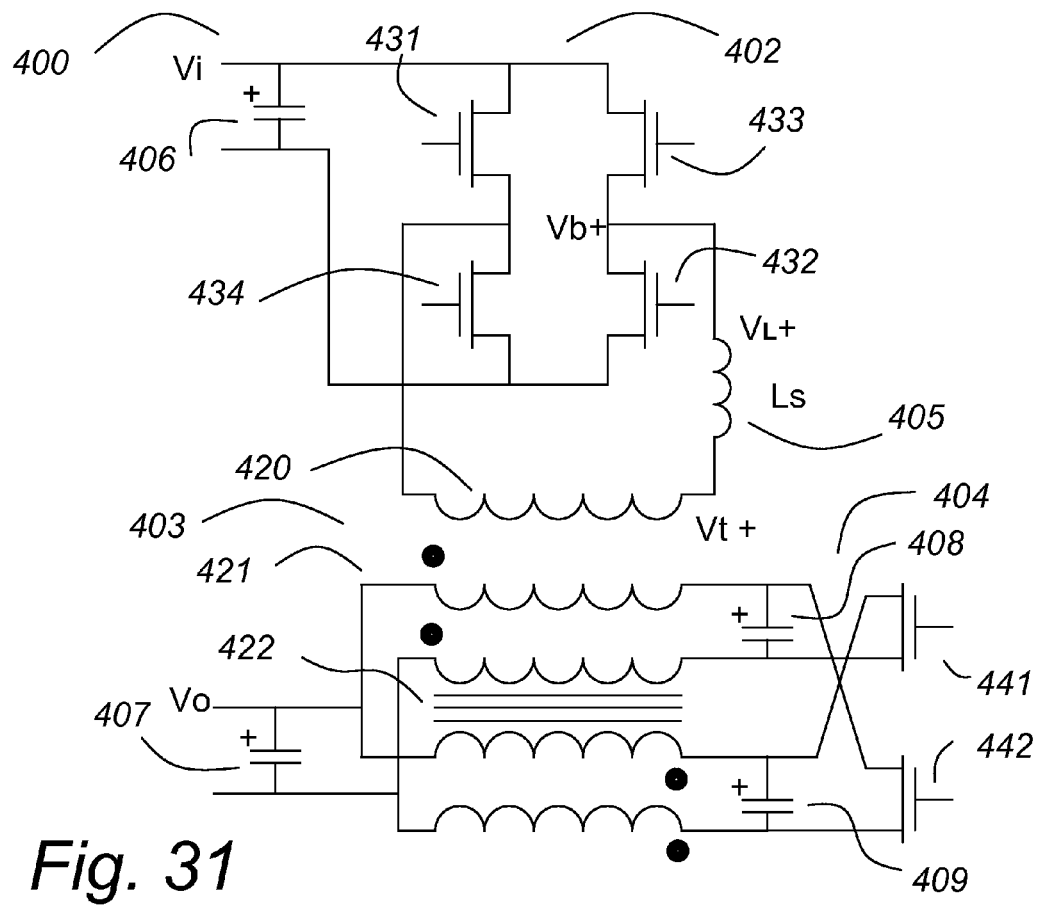
FIG. 31 shows a basic minimalized power converter.

FIG. 31 shows a minimalized power converter 400 comprising a fullbridge full-bridge switch 402, a transformer 403 and a symmetrical push-pull rectifier 404. There may be an input capacitor 406 and an output capacitor 407. The full-bridge full-bridge switch 402 comprises four switches 431-434, shown as MOSFETs as an illustration, not a limitation. The full-bridge full-bridge switch 402 drives a primary winding 420 to excite the transformer 403. An inductor 405 may be in series with the primary winding 420. The inductor 405 may be a discrete component, it may represent the leakage inductance of the transformer 403 or it may represent a lumped parameter including all series inductance of the transformer, reflected to the primary. In addition to the primary winding 420, the transformer 403 comprises a transformer core 422 and secondary winding 421. The secondary winding may be a symmetrical push-pull secondary winding 421 with common mode capacitors 408 and 409, similar to the transformer winding 101 of FIG. 25.

Although it is contemplated that the minimalized power converter may be part of a larger power system as shown in FIGS. 3, 29 and 30, FIG. 31 shows that it may comprise one transformer with a full-bridge switch and a rectifier. As long as there is sufficient series inductance, either leakage inductance, a discrete inductor or both as a lumped parameter, the teachings of this invention apply. This makes a very simple power converter with outstanding response to load transients. It is able to accommodate line regulation of at least ten percent. The preferred 100 percent duty-ratio excitation is among the most efficient power converter circuits, and minimal filtering is required. Because filters are bulky, costly and lossy, it is an advantage if they can be smaller.

The basic minimalized power converter 400 of FIG. 31 is well suited for converting an intermediate voltage to a low voltage, as an example, not a limitation.

A power supply topology known as a "dual active bridge" sometimes is used to regulate voltage through a transformer with sufficient leakage inductance or with added inductance. To the best of my knowledge and belief, it is not known to use a dual active bridge with a symmetrical push-pull winding and common mode capacitors.

Figure 32:
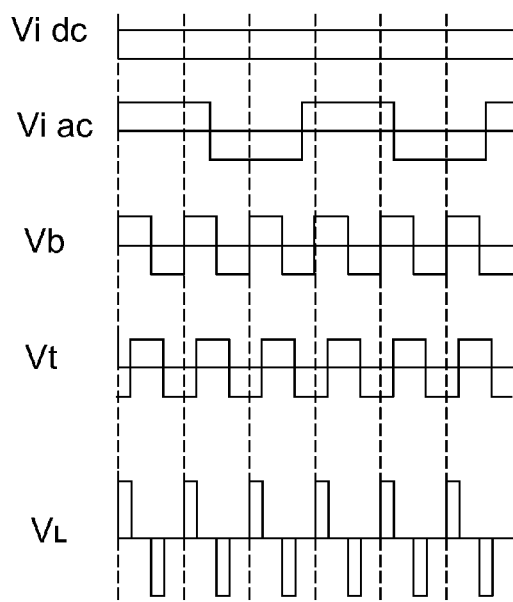
FIG. 32 shows waveforms for the minimalized power converter of FIG. 31, and shows alternate input voltages Vi dc and Vi ac.

FIG. 32 shows some of the voltage waveforms at selected nodes in the minimalized power converter 400 of FIG. 31. The first two lines of the graph show alternate input voltages, the first with Vi dc being a dc voltage is the more usual application. Vb is the output voltage of the full-bridge full-bridge switch 402. Vt is the voltage appearing across the primary winding 420 of the transformer 403, and reflects the voltage of the secondary winding 421, controlled by the timing of the rectifier 404. Note that it is offset from voltage Vb. The difference, $V_L$ appears across the inductor 405 as explained in this specification, the discussion of FIG. 8 being one instance.

In FIG. 32, note the second graph labeled Vi ac. This graph shows that the input voltage may be a square wave ac voltage and that its frequency relative to the excitation frequency of the transformer 403 is arbitrary. In this mode of operation, the input capacitor 406 would not be used. With reference to FIG. 29, this circuit could be used if it were desired to operate a pol at a higher frequency than the frequency of the ac link 206. Usually, a dc output would be provided as the input to the circuit of FIG. 400, but that suffers the losses of a rectifier and maybe an extra transformer. The full-bridge switch 402 can be used to change the excitation frequency, as follows. There are three identifiable transition states. If it is desired to change the polarity of the output voltage Vb of the full-bridge 402 and the input voltage is between transitions, then the full-bridge 402 switches state normally. If it is desired to change the polarity of the output voltage Vb of the full-bridge 402 and the input voltage is in transition at that instant, then the full-bridge 402 does not switch. If it is desired not to change the polarity of the output voltage Vb of the full-bridge 402 when the input voltage changes polarity, then the full-bridge 402 switches state, nullifying the change in polarity of the input voltage Vi ac. In this manner the input square wave can be changed to any other frequency, higher or lower, though it is more likely that an increase in frequency as shown would be what is needed.

Figure 33:
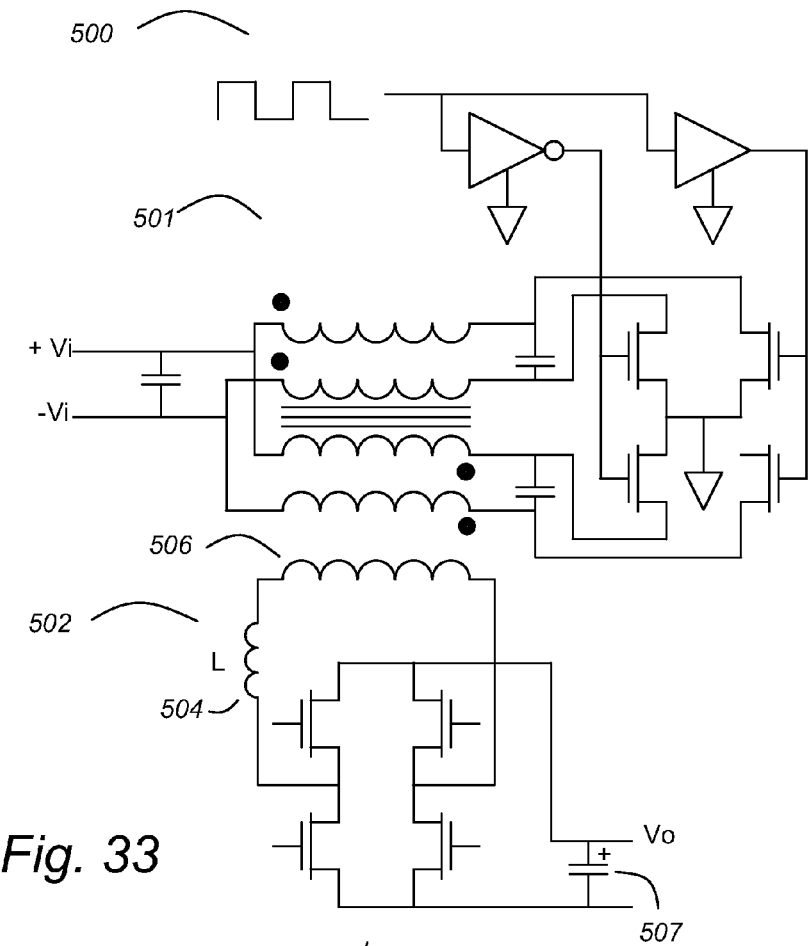
FIG. 33 shows another embodiment of a basic minimalized power converter.

FIG. 33 shows an alternative embodiment of the invention. A basic minimalized power converter 500 comprises a ground referenced symmetrical push-pull primary transformer 501, which may be the symmetrical push-pull winding 120 of FIG. 26. A single winding full-bridge secondary 506 is rectified by a full-bridge rectifier 503 of conventional design. An output capacitor 507 may filter the output, and an inductor 504 may enable current control using equations [1], [2] and [4] of this invention.

The minimalized power converter 500 is well suited for converting a high voltage to an intermediate voltage. The ground-referenced full bridge solves the problem of low and high side drivers for a high voltage full bridge circuit, but the low and high side drivers are not as much a problem for intermediate voltages.

Figure 34:
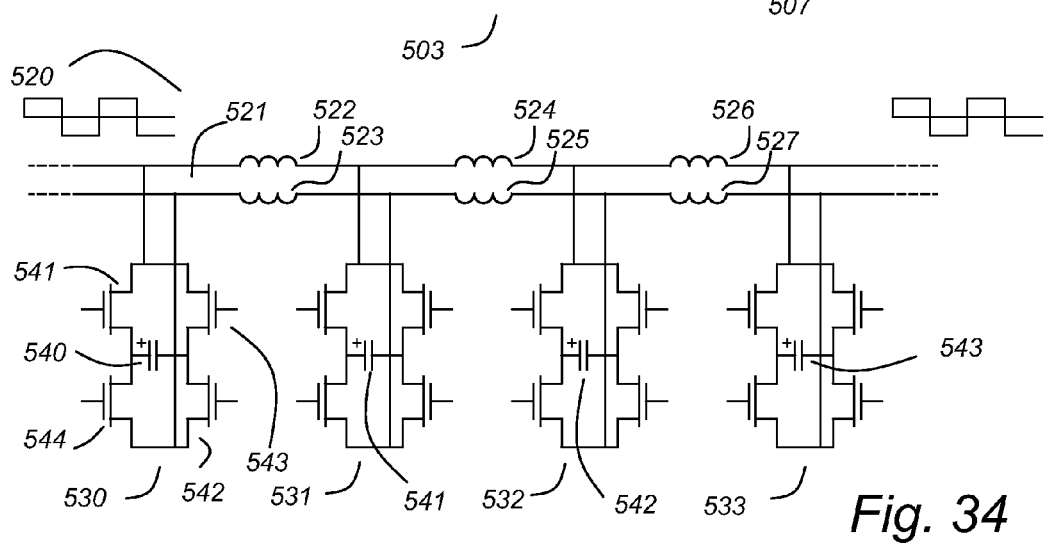
FIG. 34 shows a portion of a high frequency square-wave power distribution system. An ac power distribution link bus has parasitic inductance and several resquaring circuits.

FIG. 34 shows a portion of an ac distribution system 520 of this invention comprising an ac power distribution link 521, which is analogous to the ac power distribution link 206 of FIG. 29. As discussed above, a problem with an ac link for power distribution is the distributed stray inductance if the ac link has significant length. This is shown in FIG. 34 as a series of inductances 522-527. These are not inductor components; they represent the stray inductance from point to point along a lengthy ac link 521. (An alternative embodiment uses discrete inductors and is described below). Preferably, an power distribution ac link 521 is short, 10 cm or less, and preferably it is designed to have very low inductance as by using a multi-layer printed wiring board, or a shielded twisted pair, as examples, not limitations. However, it may be desirable to extend the ac power distribution link 521 much further, but with any significant load, the stray inductance may distort the wave-form badly. FIG. 34 show a way to preserve the integrity of the ac wave-form. Distributed along the ac link 521 is a plurality of full-bridge re-squaring circuits 530-533. The full-bridge resquaring circuits 530-533 are similar to full-bridge rectifier circuits with a plurality of capacitors 540-543 on their dc outputs, but they do not necessarily have a dc load connected to them. The resquaring circuit 530 comprises four switches 541-544 shown as MOSFETs, as an example, not a limitation, together comprising a full-bridge rectifier, and the capacitor 540. The full-bridge re-squaring circuits are operated at the same frequency and at the instant of operation, the capacitors 540-543 function as voltage sources to the extent necessary to square up the ac wave-form. Good MOSFETs have a very low voltage drop when on, so there is little difference between the capacitor voltage and the magnitude of the square-wave voltage, Vi1 in this example. More resquaring circuits may be added, and may be needed at the ends of long runs or branches of the ac link 521, or at intervals along it, if it is long. Due to the stray inductance of a longer ac link, the ac wave-shape may be degraded if not re-squared. The re-squaring circuits, 530-533 in this circuit, may do double duty as full-bridge switches or rectifiers as well, operate synchronously and effectively become a plurality of distributed voltage sources, locally filling in any rounding of the square-wave voltage. The stray inductance and other impedances to the re-squaring circuits 530-533 must be sufficiently low so that their capacitors 540-543 can fully recharge during the square-wave pulse time, preferably with five time constants or more during the pulse width T, with reverence to FIG. 5. The circuit must also be damped, or the capacitors 540-543 could charge resonantly to an overvoltage. Given the on resistance of the MOSFETs and the resistance of the conductors considering the skin effect and other high frequency effects, resonant overcharging should not be a problem.

If the ac power distribution link 521 is sufficiently long to have so much stray inductance that the capacitors 540-541 cannot recover their charge and voltage during the pulse width T, the voltage will droop at higher loads on the ac power distribution link 521. If this is the case, it may be necessary not to switch the re-squaring circuits 530-533 synchronously but with an offset time t from one re-squaring circuit 530-533 to the next so that the teachings of this invention are invoked and the voltages are corrected through current control using the algorithm of equations [1] and [2]. With only the stray inductance 522-527, the optimum transition times t may be too short for good control. In this situation, real inductor components 522-527 may be used. To retain balance, it is preferred to divide the inductance into two inductors 522-527, one in each conductor as shown in FIG. 34. As an example, not a limitation, if long ac power distribution links 521 are used to distribute power to a number of chassis in a rack, it may be preferred to use a pair of inductors and a timed re-squaring circuit at each chassis. This re-squares the square-wave voltage and corrects its voltage magnitude, and may be distributed to a number of nearby pols.

Any of the re-squaring circuits 530-533 can do double duty as a rectifier or full-bridge switch to transfer power, but if they do not, their losses are very low as they conduct current only for a short pulse at each transition of the square-wave voltage through zero, then they conduct current in the other direction at a low level to recharge their capacitors. Of course, there is some gate drive energy as well, but smaller MOSFETs can be used, so that is small.

Of course, the full-bridge re-squaring circuits 530-533 could have a load attached, or they could be attached to a battery as suggested for V1 and the rectifier 201 in the discussion of FIG. 30, it being a similar circuit.

Figure 35:
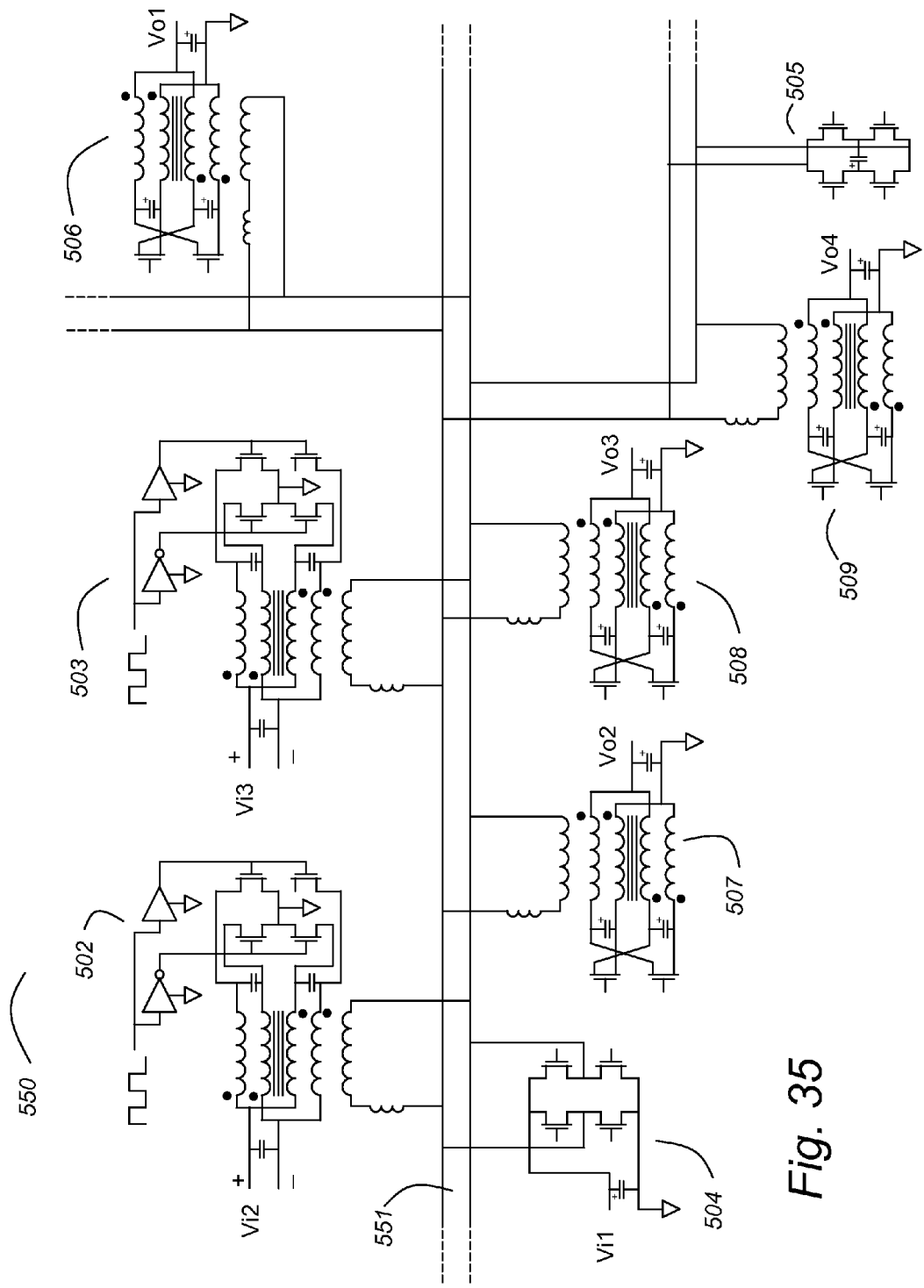
FIG. 35 shows a high frequency square-wave power distribution system with several inputs, several outputs and a re-squaring circuit.

FIG. 35 shows another embodiment of the invention. A power distribution system 550 uses an ac power distribution link 551 to distribute power. As shown by the branches and dashed lines on the ends, the ac power distribution link 551 is of indefinite length, with an indefinite number of branches and may distribute power to any number of compatible circuits. As an example, not a limitation, the power distribution system 550 has three power inputs Vi1-Vi3 and four power outputs Vo1-Vo4. It also has a full-bridge re-squaring circuit 505 on a branch, similar to those described in FIG. 34. In FIG. 35, a full-bridge full-bridge switch 504 accepts an input voltage Vi1 and connects directly to the ac power distribution link 551. It may have a dual function as a power transfer point and as a resquaring circuit, and it may be switched synchronously with the full-bridge re-squaring circuit 505. As an example, not a limitation, Vi1 may be a battery or may be derived from a battery, a capacitor bank or other energy storage device or power source and may have current flow in either direction. Regardless, the full-bridge switch 504 establishes the baseline frequency and time reference for the ac link 551.

Two symmetrical push-pull transformer circuits 502 and 503 may accept power from redundant power sources Vi2 and Vi3, which may be 380 V dc power buses in a data-center power distribution system, as an example, not a limitation. The symmetrical push-pull transformer circuits are explained in the discussion of FIG. 26 and the details are not repeated here. The input currents can be controlled using equations [1], [2] and [4].

Four symmetrical push-pull transformers 506-509 provide four output voltages Vo1-Vo4. By controlling the output currents using equations [1], [2] and [4], the output voltages can be precisely controlled, assuming that the turns-ratio of the transformers therein are approximately correct. Usually the current flow is out of the output voltages Vo1-Vo4, but reverse current flow is accommodated if needed.

The ground-referenced full-bridge symmetrical push-pull transformer circuits 502 and 503 are well suited for accepting a high voltage input as minimalized input current control circuits, and the need for high voltage high and low side drivers is avoided. Symmetrical positive and negative voltages are preferred as the input voltage, but asymmetric or single-ended voltages can be used if the reference for the bridge drivers is at a mid-point voltage.

Both the re-squaring circuit 505 and the input full-bridge switch 504 function as re-squaring circuits, as both have capacitors separated from the ac power distribution link 551 by turned on MOSFETs. Good MOSFETs have a very low voltage drop when on, so there is little difference between the capacitor voltage and the magnitude of the square-wave voltage, Vi1 in this example. More resquaring circuits may be added, and may be needed at the ends of long runs or branches of the ac power distribution link 551, or at intervals along it, if the ac power distribution link 551 is long. Due to the stray inductance of a longer ac power distribution link 551, the ac wave-shape may be degraded if not re-squared. The re-squaring circuits, 504 and 505 in this circuit, though 504 does double duty as a full-bridge switch as well, operate synchronously and effectively become a plurality of distributed voltage sources, locally filling in any rounding of the square-wave voltage. The stray inductance and other impedances to the re-squaring circuits 504 and 505 must be sufficiently low so that their capacitors can fully recharge during the square-wave pulse time. If they cannot recharge, series inductors may be used as described with FIG. 29. Any of the re-squaring circuits 505 can do double duty as a rectifier or full-bridge switch to transfer power, but if they do not, their losses are very low as they conduct current only for a short pulse at each transition of the square-wave voltage through zero, then they conduct current in the other direction at a low level to recharge their capacitors. Of course, there is some gate drive energy as well, but smaller MOSFETs can be used, so that is small.

DEFINITIONS

For this specification and the claims, a "square-wave voltage" is a voltage as shown in FIG. 5, with sharp transitions, constant voltage magnitude and equal positive and negative pulse widths. A "square-wave voltage source" is any device that produces a square-wave voltage, including but not limited to a dc voltage source plus a full-bridge switch circuit. The square-wave voltage has regular transition times from a more positive voltage to a more negative voltage and from a more negative voltage to a more positive voltage. "More negative" and "more positive" are comparative terms as a voltage reference may not necessarily be defined.

For this specification and the claims, an "ac link" or an "ac power distribution link" is a pair of conductors connecting an ac voltage source to one or more loads, including but not limited to point of load (pol) power converters. An ac power distribution link may include branches and power planes in a printed wiring board.

For this specification and the claims, a "rectifier" is a switching device for converting an ac square-wave to a dc voltage of nominally equal magnitude. The rectifier has regular switching times from a positive conducting state to a negative conducting state. The regular switching times of the rectifier are nominally synchronized to the regular transition times of the square-wave voltage, having the same frequency. When there is a series inductor, the regular switching time of the rectifier may be offset from the regular switching time of the square-wave voltage by an offset time t as defined in FIG. 5 to control the current through the series inductor and thus the current through the rectifier, as for example, to control the dc output voltage.

For this specification and the claims, a "full-bridge switch" is a switching device for converting a dc voltage into an ac square-wave voltage of nominally equal magnitude. The full-bridge switch has regular switching times from a positive conducting state to a negative conducting state. The regular switching times of the full-bridge switch are nominally synchronized to the regular transition times of the square-wave voltage, having the same frequency. When there is a series inductor between the full-bridge switch and an ac power distribution link having a square-wave voltage, the regular switching time of the full-bridge switch may be offset from the regular switching time of the square-wave voltage of the ac power distribution link by an offset time t as defined in FIG. 5 so as to control the current through the series inductor and thus through the full-bridge switch.

For this specification and the claims, a rectifier and a full-bridge switch may be interchangeable, the circuits often being the same or similar except for the direction of current flow. A high frequency square-wave power distribution system connecting an ac power distribution link to produce a dc output voltage may have circuit identified as a "rectifier". An identical or very similar circuit may receive power from a dc voltage source, to provide power to the ac power distribution link, and may be identified as a "full-bridge switch". Some circuits conduct current in either direction, such as an input/output connected to a battery that may receive power from the battery or charge the battery depending upon the mode of operation. Thus a rectifier may become a full-bridge switch, a full-bridge switch may become a rectifier or either may be a full-bridge switch and a rectifier (full-bridge switch/rectifier), though that is awkward nomenclature and usually one or the other descriptor will be chosen to describe the circuit.

For this specification and the claims, a "re-squaring circuit" is a circuit such as that shown in FIG. 34 comprising a rectifier and a capacitor. A rectifier or full-bridge switch that is directly connected to an ac power distribution link may also function as a re-squaring circuit, the important criteria being that the resquaring circuit, the full-bridge switch and the rectifier operate synchronously with other similar circuits and that they separate the capacitor from the ac power distribution link only by turned on switches such as MOSFETs having a very low voltage drop so that the magnitude of the square-wave voltage on the ac power distribution link and the voltage on the capacitor are nearly equal.

For this specification and the claims, a "series inductor" and a "series inductance" as part of a minimalized power converter of this invention is the series inductance in the ac link between an ac voltage source and one or more rectifiers. It may be a discrete inductor component, the stray and leakage inductance or a lumped inductance that is the sum of all discrete inductor components and the stray and leakage inductance of the circuit. If not otherwise specified, a "series inductor" or "series inductance" is the lumped total of the series inductances. In general, series inductors or inductances are added to determine the value of a lumped inductance, and coupled inductors or inductances are treated as one component.

The ac link may include a series transformer, and the square-wave voltage and the square-wave currents are changed from the primary winding to the secondary winding in accordance with the turns-ratio of the transformer as is well known to one skilled in the art of transformers. The stray and leakage inductance of the transformer are included in the lumped inductance unless they are small enough to be neglected as an approximation. In this specification and the claims, reciting a series transformer in series with the ac link includes the connections of the ac link to the primary winding of the transformer and the connections of the secondary winding of the series transformer to the ac link, continuing the ac link by definition as if it were uninterrupted although the voltages and currents may be transformed as turns-ratio of the series transformer and although the sections of the ac link may be dielectrically isolated by the series transformer. This definition is to avoid reciting all of the details of the transformer, its windings and its connections to the ac link as these details are not a point of novelty. When all of the voltages, currents and impedances are reflected to one point relative to the transformer, the transformer no longer is a factor of the calculations of the control algorithm, as a justification for treating the ac link as a continuum.

For this specification and the claims, the "current control algorithm" is equations [1] and [2] and equations [4] and [2]. In response to changes in the output current, the current control algorithm includes the various applications of equations [1], [2] and [4] as discussed and illustrated with FIGS. 17 through 23.

Several of the components and devices recited in this specification and the claims have two conductors as their inputs and outputs, which may be called "power" and "return" or "first output" and "second output" or some similar designation in common jargon of the art. When, in the specification and the claims, such components and devices are "connected", it means that all needed connections are made, for example a power output of a first device is connected to the power input of a second device and the return output of the first device is connected to the return input of the second device. As another example, a dc output of a rectifier may be connected to an output capacitor and a dc load. It is understood that both connect in parallel to the rectifier output and its return. "Connected" or "connected in series" may include a connection being through a recited series device such as the series inductor or the series transformer, it being understood that the conductor comprising the connection is interrupted by the series device but that current flows through the series device to the continuing conductor as a continuum. The ac link may be recited as a connection having a series inductor or a series transformer. This is to avoid reciting the details of making the various connections as such details would be well understood by one skilled in the art of electrical assembly, they are not points of novelty and they contribute nothing of importance to the understanding of the invention.

When devices are recited as being "in series", the order in which they are in series is not important and any order of the devices in series is equivalent. As an example, reciting "an ac link having a series inductor and a series transformer in series in the ac link" or similar wording may connect first through the series inductor and then through the series transformer or it may connect first through the series transformer and then through the series inductor. Reciting "a series inductor in an ac link" or similar wording includes dividing the series inductor into two or more inductors that are in series and may be located apart. As an example, not a limitation, part of the series inductance may be in series before a transformer and part of the series inductance may be in series after the transformer. As another example, not a limitation, "an inductor in series in an ac link" includes dividing the series inductor into two inductors, each of one half the inductance of the recited inductor, one half being in series in each conductor of an ac link having two conductors. For analysis, a series inductor is reflected through the transformer to a common point relative to the transformer, usually to the ac link, making the physical location of the series inductor unimportant for analysis.

A high frequency square-wave power distribution system may include a number of minimalized power converters having the ac power distribution link as a common connection, as shown in FIGS. 29, 30 and 35. Usually, when analyzing one of the minimalized power converters, the square-wave voltage of the ac power distribution link is considered to be the voltage source, and usually each minimalized power converter will have its own series inductance between the ac power distribution link and the rectifier (in the case of an output) or the full-bridge switch (in the case of an input), as seen in FIG. 35. Sometimes, several rectifiers, usually with separate transformers, are connected to the ac power distribution link through a single series inductor, as seen in FIG. 29. In this case, the rectifiers operate synchronously and are considered as one for analysis. The output capacitors are reflected through any transformers and added, and if the stray and leakage inductances are considered, they are reflected through any transformers and calculated as parallel inductances, calculations that would be well known to one skilled in the art of circuit analysis.

In this specification and the claims, a "control means" is "responsive to the control algorithm" if the control means has knowledge of, or has inputs to measure the parameters needed to calculate the offset time t using equations [1], [2] and [4]. The control means is "responsive to voltage feedback" if it uses voltage feedback to vary the offset time t to control the current through the series inductor and thereby control the output voltage. An optimized system may use both, to calculate the offset time t using the control algorithm and further to use feedback to refine the determination of the offset time t to compensate for parametric errors and the approximation of the control algorithm to make the output voltage more precise. Techniques such as this are well known to one skilled in the art of power conversion and can be applied to the teachings of this invention without undue experimentation.

In this specification and the claims, "total charge measurement" means the total charge measurement and control as taught in U.S. Pat. No. 7,394,230.

In this specification and the claims, reciting a "minimalized pol power converter" means a minimalized power converter of this invention, for example, not as a limitation, in accordance with FIG. 4. A minimalized pol power converter includes an inductor, a rectifier and an output capacitor. The inductor may or may not be a shared inductor with other minimalized pol power converters, as in FIG. 29. A minimalized pol power converter may or may not include a transformer. Reciting a minimalized pol power converter includes minimalized input current control circuits, as in FIG. 30, they being functionally the same except for the usual direction of current flow. Reciting a minimalized pol power converter includes minimalized power converters that control power flow in both directions, as examples, not limitations, if connected to a energy storage device or a regenerative load, they being functionally the same except for the direction of current flow. Note that equations [1], [2] and [4] are valid for current flow in either direction.

The invention claimed is:

1. A high frequency square-wave power distribution system comprising,
   a square-wave voltage source for producing a square-wave voltage,
   the square-wave voltage having a first regular transition time T1 from a positive voltage to a negative voltage and having a second regular transition time T2 from a negative voltage to a positive voltage, an ac power distribution link connecting the square-wave voltage source to a rectifier having a dc output for producing a dc output voltage, the rectifier having a third regular switching time T3 from a positive conducting state to a negative conducting state and having a fourth regular switching time T4 from a negative conducting state to a positive conducting state a series inductor in series in the ac power distribution link, the series inductor conducting an inductor current, an output capacitor connected to the dc output of the rectifier, a control means responsive to a voltage feedback from the dc output for controlling a duration of an offset time (t) equal to the time difference between the first regular transition time T1 of the square wave voltage and the third regular switching time T3 of the rectifier, and also equal to the time difference between the second regular transition time T2 of the square wave voltage and the fourth regular switching time T4 of the rectifier, the duration of the offset time (t) thereby controlling the inductor current through the series inductor in response to variations of the dc output voltage.

2. The high frequency square-wave power distribution system of claim 1 wherein the square-wave input voltage source is a dc voltage source and a full-bridge switch.

3. The high frequency square-wave power distribution system of claim 1 further comprising a series transformer in series in the ac power distribution link.

4. The high frequency square-wave power distribution system of claim 2 further comprising a series transformer in series in the ac power distribution link.

5. A converter high frequency square-wave power distribution system comprising at least a first square-wave input voltage source for producing at least a first square-wave input voltage, the at least first square-wave input voltage having at least a first regular transition time T1 from a positive voltage to a negative voltage and having at least a second regular transition time T2 from a negative voltage to a positive voltage, an ac power distribution link connecting the at least first square-wave voltage source to at least a first rectifier, the at least first rectifier having at least a first dc output for producing at least a first dc output voltage, the at least first rectifier having at least a third regular switching time T3 from a positive conducting state to a negative conducting state and having a fourth regular switching time T4 from a negative conducting state to a positive conducting state, at least a first series inductor in series in the ac power distribution link, the at least first series inductor conducting at least a first inductor current, and at least a first output capacitor connected to the at least first dc output of the at least first rectifier, a control means responsive to at least a first voltage feedback from the at least first dc output for controlling a duration of at least a first offset time (t) equal to the time difference between the first regular transition time T1 of the at least first square wave voltage and the at least third regular switching time T3 of the at least first rectifier, and also equal to the duration of equal to the time difference between the second regular transition time T2 of the at least first square wave voltage and the at least fourth regular switching time T4 of the at least first rectifier, the duration of the at least first offset time (t) thereby controlling the at least first inductor current through the at least first series inductor in response to variations of the at least first dc output voltage.

6. The high frequency square-wave power distribution system system of claim 5 wherein the at least first square-wave input voltage source is at least a first dc voltage source and at least a first full-bridge switch.

7. The high frequency square-wave power distribution system system of claim 5 further comprising at least a first series transformer in series in the ac power distribution link.

8. The high frequency square-wave power distribution system system of claim 6 further comprising at least a first series transformer in series in the ac power distribution link.

9. The high frequency square-wave power distribution system system of claim 5 further comprising a plurality of minimalized point of load (POL) power converters.

10. The high frequency square-wave power distribution system of claim 9 wherein the ac power distribution link further comprises at least a first re-squaring circuit comprising at least a first re-squaring full-bridge rectifier and at least a first re-squaring capacitor.

11. The high frequency square-wave power distribution system of claim 9 wherein the ac power distribution link further comprises a plurality of re-squaring circuits, each of the plurality of re-squaring circuits respectively comprising a respective re-squaring full-bridge rectifier and a respective re-squaring capacitor.

12. The high frequency square-wave power distribution system system of claim 5 wherein the ac power distribution link further comprises at least a first series inductor in series in the ac power distribution link.

13. The minimalized power converter system of claim 9 wherein the ac power distribution link further comprises a plurality of series inductors in series in the ac power distribution link.

* * * * *